(12) United States Patent
Lair

(10) Patent No.: US 6,751,944 B2
(45) Date of Patent: Jun. 22, 2004

(54) CONFLUENT VARIABLE EXHAUST NOZZLE

(75) Inventor: Jean-Pierre Lair, San Antonio, TX (US)

(73) Assignee: The NORDAM Group, Inc., Tulsa, OK (US)

(*) Notice: Subject to any disclaimer, the term of this patent is extended or adjusted under 35 U.S.C. 154(b) by 184 days.

(21) Appl. No.: 10/274,653

(22) Filed: Oct. 21, 2002

(65) Prior Publication Data

US 2003/0126856 A1 Jul. 10, 2003

Related U.S. Application Data

(60) Provisional application No. 60/336,505, filed on Oct. 23, 2001.

(51) Int. Cl.$^7$ .............................. F02K 3/02; B05B 12/00
(52) U.S. Cl. ........................ 60/226.3; 60/226.2; 60/770; 239/265.25
(58) Field of Search ................ 60/226.2, 770, 60/276.1, 226.3; 239/265.11, 265.19, 265.25

(56) References Cited

U.S. PATENT DOCUMENTS

| | | |
|---|---|---|
| 3,779,010 A | 12/1973 | Chamay et al. |
| 3,820,719 A | 6/1974 | Clark |
| 4,291,782 A * | 9/1981 | Klees .......................... 181/215 |
| 4,922,712 A | 5/1990 | Matta et al. |
| 4,922,713 A | 5/1990 | Barbarin et al. |
| 5,181,676 A | 1/1993 | Lair |
| 5,221,048 A | 6/1993 | Lair |
| 5,655,360 A | 8/1997 | Butler |
| 5,694,767 A * | 12/1997 | Vdoviak et al. ........... 60/226.3 |
| 5,778,659 A | 7/1998 | Duesier et al. |
| 5,779,192 A | 7/1998 | Metezeau et al. |
| 5,819,527 A | 10/1998 | Fournier |
| 5,826,823 A | 10/1998 | Lymons et al. |
| 5,853,148 A | 12/1998 | Standish et al. |
| 5,863,014 A | 1/1999 | Standish |
| 5,875,995 A | 3/1999 | Moe et al. |
| 5,913,476 A | 6/1999 | Gonidec et al. |
| 5,934,613 A | 8/1999 | Standish et al. |
| 6,070,407 A * | 6/2000 | Newton ..................... 60/226.1 |
| 6,101,807 A | 8/2000 | Gonidec et al. |

* cited by examiner

*Primary Examiner*—Charles G. Freay
(74) *Attorney, Agent, or Firm*—Francis L. Conte

(57) ABSTRACT

A gas turbine engine exhaust nozzle includes coaxial inner and outer conduits. The inner conduit has a main outlet at an aft end thereof, and a row of radial apertures spaced upstream from the outlet. The outer conduit has an auxiliary outlet at an aft end thereof, and surrounds the inner conduit over the apertures to form a bypass channel terminating at the auxiliary outlet. A plurality of flaps are hinged at upstream ends thereof to selectively cover and uncover corresponding ones of the apertures and selectively bypass a portion of exhaust flow from the inner conduit through the outer conduit in confluent streams from both the main and auxiliary outlets.

29 Claims, 29 Drawing Sheets

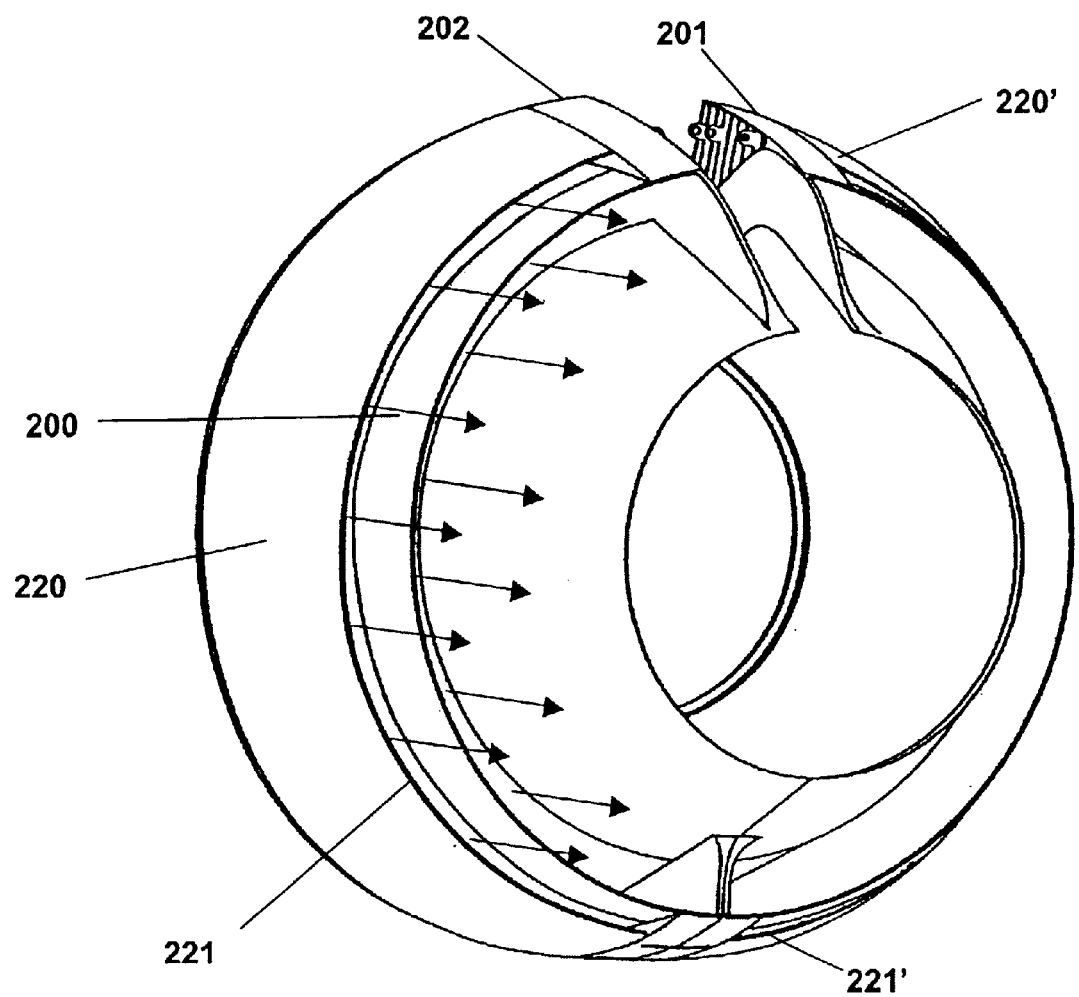

CONFLUENT VARIABLE EXHAUST NOZZLE

This application claims the benefit of U.S. Provisional Application No. 60/336,505; filed Oct. 23, 2001.

The present invention relates generally to turbofan aircraft engines, and more specifically, to exhaust nozzles therefor.

BACKGROUND OF THE INVENTION

Exhaust nozzles are used on business and commercial aircraft for reducing the noise produced by the engine at take-off, as well as for optimizing the aircraft take-off, climb and cruise performance, and for decelerating the aircraft at landing.

Variable area exhaust nozzles are known in the art. For example, U.S. Pat. No. 5,221,048 describes a variable exhaust area nozzle comprising a fixed structure or nacelle on which are hinged two pivoting half shells or nacelle extensions including an exit nozzle that cooperate radially and longitudinally with the nacelle. Fluid tightness between the two half shells and the fixed part is ensured through a sealing arrangement. Actuating means control the opening position of the shells to their fully opened position or to their fully closed position or to any intermediate position, allowing the adjustment of the nozzle exhaust area to the particular value required for achievement of optimum performance for the particular flight conditions.

The system described in patent '048 is advantageous because it has a relatively low number of moving parts, and at the same time it allows the area variation of the exhaust of the nozzle. Therefore, at take-off, with the variable nozzle opened, meaning that the value of the nozzle throat area is increased, the noise generated by the engine is decreased. During climb, with the variable nozzle closed, meaning that the nozzle throat area is reduced to its minimum value, climb performance is improved, and at cruise with the variable nozzle set to its nominal position, cruise performance is optimized.

However, the adjustments of the two shells that control the value of the area of the throat of the variable nozzle to any position between its two extreme positions, necessitate the use of actuating means with rather sophisticated control logic if the adjustments are fully integrated to the engine computer. This has a direct consequence of increasing the cost of the technology. Also, when the shells move away from their nominal position, they modify the outer mold line (OML) of the rear part of the nacelle.

While, from a performance point of view, this is not critical, as when this happens, the aircraft is at rather low speed, and for cosmetic reasons it is desirable that the OML not be altered by the operation of the variable nozzle. Also, while the variable nozzle described in patent '048 is attractive and readily applicable to business aircraft using engine with long nacelle, it has been found that it is more difficult to use this technology on short nacelle, a more commonly used installation on commercial aircraft.

Another limiting factor to the use of the variable nozzle described in patent '048 is that it is difficult to integrate it on a nacelle equipped with a target type thrust reverser and that its delta weight with a fixed nozzle tends to increase as the engine thrust category is greater than 40,000 pounds.

In order to reduce the landing distance of a turbofan engine powered aircraft as well as to increase the level of safety when the aircraft is landing on a wet or icy runway, thrust reversers are utilized to re-direct forward the flow of engine exhaust gases in order to provide a braking thrust for the aircraft.

There are basically two main types of thrust reversers used on turbofan engines. A first type reverses the total mass flow, core and fan flows, while the second type reverses the fan flow only.

As disclosed in the detailed description, the variable exhaust nozzle according to the present invention is applicable to both types of thrust reversers. The exhaust nozzle can be installed on nacelles of turbofan engines that are fitted on the fuselage or under the wings of an aircraft. The nacelles may or may not be equipped with a thrust reverser, and they can be of the long, short, or C-duct types.

Typically, the thrust reversers that reverse the total mass flow of the engine are more commonly called target reversers or pivoting doors reversers, and are generally composed of at least a pair of thrust reverser doors capable of pivoting about axes which are substantially transverse to the axis of the engine, between a stow position for forward thrust and deploy position for reverse thrust. While most of these target reversers constitute a portion of the exhaust nozzle when they are in their stow configuration, very few of them have the capability for adjustment of the throat of the exhaust nozzle for optimizing the aircraft performance during take-off climb and cruise, or for reducing the noise emitted by the engine during take-off.

Typical examples of target or pivoting door reversers are described in U.S. Pat. Nos. 5,779,192, 5,826,823, 5,819,527 and 5,875,995. In U.S. Pat. No. 5,779,192, the depicted apparatus has two reverser doors 17a, 17b which are pivotally mounted respectively about stationary axis 18a, 18b. With the reverser doors in the stow position, they form the exhaust nozzle for the engine gases, and the throat is not adjustable and is located at the trailing edge 19 of the reverser doors.

In U.S. Pat. No. 5,826,823, typical of a pivoting doors type reverser, the apparatus has a fixed structure that cooperates with at least two reverser doors 26, 28. The fixed structure 20 includes side beams 22 that terminate in an annular aft portion 24. It is the fixed annular portion 24 that forms the exhaust nozzle for the jet engine, and the nozzle throat located at the trailing edge of the fixed portion is not adjustable.

In U.S. Pat. No. 5,819,527, the structural composition of the apparatus is very similar to U.S. Pat. No. 5,779,192, i.e., the exhaust nozzle is formed by an aft fixed, non-adjustable structure 3. In U.S. Pat. No. 5,875,995, a fixed non-adjustable rear annular portion 34 forms the exhaust nozzle.

A typical example of a target reverser with throat adjustment capability is described in U.S. Pat. No. 5,181,676. When the reverser doors 30 are stowed, a pair of shells 44 that cooperates with the pair of thrust reverser doors forms the exhaust nozzle. The pivots 40 of the reverser doors, which are linked to the corresponding pivots 58 of the shells via arms 56, have the capability of undergoing a radial and longitudinal displacement that confers the adjustment of the area to the throat of the exhaust nozzle.

While this arrangement is attractive by its simplicity, the amount of throat area variation capability is limited to about 10% over the nominal value. The limitation is a consequence of the mechanical arrangement that necessitates, in forward thrust, the radial and longitudinal displacement of the thrust reverser doors so that the throat area of the exhaust nozzle can be adjusted to the desired value. Also, when the reverser doors and shells move away from their nominal position, they modify the outer mold line of the rear part of the nacelle.

While, from a performance point of view, this is not critical, as when this happens, the aircraft is at rather low speed, and for cosmetic reasons it is desirable that the OML be not altered by the operation of the variable nozzle. Also, while the thrust reverser with variable nozzle described in patent '676 is attractive and readily applicable to business aircraft using engine with long nacelle, it has been found that it is more difficult to use this technology on short nacelle, a more commonly used installation on commercial aircraft.

Typically, the thrust reversers that reverse the fan flow only can be classified into three main groups: the cascades type, the pivoting doors type and the fan reverse pitch mode type. With reference to the cascades type, for example, U.S. Pat. Nos. 3,779,010, 4,922,713 and 5,655,360 show a cascades type fan thrust reverser with a variable nozzle for the fan flow only. A cascades type fan thrust reverser function and operation being well known in the art, no further comments will be offered on that particular aspect.

However, it is important to concentrate on the variable nozzle portion of these fan reversers to understand the novelty of the present invention. As shown in U.S. Pat. Nos. 3,779,010 and 4,922,713, the increasing of the fan exit area is achieved through the axial separation of a downstream structure with relation to an upstream structure.

It is this axial separation between the downstream and upstream structures that creates the opening so that a portion of the fan flow can be directed through the opening to increase the fan flow exit area. Also, when the downstream and upstream structures are axially separated, the portion of the fan flow that exits through the created opening necessitates the use of rather sophisticated devices for promoting the attachment of the flow portion to the outer surface of the downstream structure.

In U.S. Pat. No. 5,655,360, the increasing of the fan exit area is achieved through the axial rearward translation of an aft cowl 34 that cooperates with a fixed core cowl 22, and the thrust reverser function is achieved by the further rearward axial displacement of cowl 34 that uncovers the cascades 42 and deploy the blocker doors 44. While the variable nozzle performance of this patent is most certainly more efficient than what is described in U.S. Pat. Nos. 3,779,010 and 4,922,713, it has still the drawback of having the thrust reverser function and the variable nozzle function achieved via the axial rearward translation of the same structure. This in turn necessitates the use of additional retention devices with rather sophisticated control logic to prevent inadvertent in-flight deployment of the reverser.

In another example, U.S. Pat. No. 5,778,659 shows a fan reverser with a variable exhaust nozzle. While the technology described in this patent is an improvement over the prior art, since now the variable nozzle function is segregated from the thrust reverser function, it still requires the rearward axial translation of a sleeve 38 that cooperates with the fixed core cowl 26. The required associated tracks and actuation system contribute to increasing the weight of the overall installation.

With reference to the second group of fan reversers, i.e., the pivoting doors type, U.S. Pat. Nos. 4,922,712, 5,863, 014, 5,913,476, 5,934,613, 6,101,807, for example, show that these reversers are generally composed of a plurality of doors hinged on a fixed structure. The fixed structure has a downstream end that forms the exhaust nozzle for the fan flow, and the exhaust nozzle has no capability for throat area adjustment.

With reference to U.S. Pat. No. 5,853,148, the exhaust nozzle of the fan reverser has throat area adjustment capability. Adjustment of the value of the throat area of the fan nozzle is achieved through the rearward axial displacement of an annular structure 15 that cooperates with a fixed core cowl 11 via guiding tracks 17, 18. This arrangement has the drawback of increasing the weight of the installation because of the required additional movable structure with its associated guiding tracks and actuation system.

With reference to the third group of fan reversers, i.e., the fan reversing pitch, U.S. Pat. No. 3,820,719 shows that, in forward thrust, the adjustment of the value of the throat of the fan nozzle is achieved through the rearward and axial displacement of an annular structure 20 that cooperates with a fixed structure 24 via guiding tracks 19, and that reverse thrust is achieved by further rearward displacement of the, same, annular structure combined with the reversing of the pitch of the fan.

While it is advantageous to provide a larger exit area for the nozzle flow at take-off and during part of climb, the above systems are based on the rearward axial translation of a structure with associated translating tracks and actuation system, for creating the required opening to the fan flow in direct thrust and for uncovering the cascades and deploying in the fan duct of a plurality of blocker doors for reverse thrust operation. This in turn leads to a significant additional weight that is detrimental to the overall performance of the aircraft.

Aircraft noise pollution is becoming a major environmental concern for the world community. The Federal Aviation Administration (FAA) is responding to this concern by imposing more stringent noise restrictions for aircraft certification than ever before. Research and development of noise-reduction technology is underway for newer engines and for retrofitting existing engines so that they are as quiet as, or quieter than, required. By using laser Doppler velocimetry technology, it is possible to perform a comprehensive detailed analysis of the jet exhaust turbulence and internal velocity fields of the jet flows.

Noise suppressors in current use are revising the noise pattern by changing primarily the vibration frequency of the noise created by the engine exhaust. For long nacelles, these noise suppressors consist primarily of ordinary jet nozzles that have a special configuration: they consist mainly of multi-lobes that are forming the exhaust of the engine core hot flow. This multi-lobes exhaust nozzle type, also called mixer nozzle, is installed on the turbine exhaust casing, and is surrounded by the by-pass fan airflow. Their objective, for improved performance and reduced jet noise, is to ensure the mixing of the turbofan engine core and fan subsonic flows, prior to their fixed, non-adjustable, common exhaust.

The jet noise is reduced with improved internal exhaust gas mixers. The laser Doppler velocimetry measurements at the fixed common exhaust nozzle shows the presence of high-velocity regions at the common nozzle exit. These regions directly correspond to the particular configuration of the mixer lobes. This means that there are as many high-velocity regions as there are lobes on the mixer.

While tests show that the number of lobes on a mixer does not greatly affect the radial mean velocity, tests also show that the turbulence intensity, with respect to the centerline velocity, is lower for a higher number of lobes mixer. Tests also show that the radial mean velocity, with mixer nozzles, is reduced compared to a non-mixer core nozzle. As a direct consequence of the reduction of the mean jet exhaust velocity, the acoustic data shows that mixer nozzles are quieter than non-mixer core nozzles. The high frequency noise is the result of the mixing between the hot core flow and the cold fan flow within the structure of the fixed common exhaust nozzle. Acoustic tests show that the higher the number of lobes on a mixer, the lower high frequency mixing noise.

When the exit area of the common exhaust of the hot core flow and the cold fan flow is adjustable, acoustic tests, on real turbofan engine, demonstrate that the noise is further reduced compared to a non-adjustable exit area of the common exhaust. This is true whether the core nozzle is of a mixer type or not. However, the greatest noise reduction is achieved when both flows are mixed within the common exhaust nozzle, and with the exit area of the common exhaust nozzle increased. The opening of the exit area of the common exhaust further reduces the vibration frequency of the noise created by the engine exhaust.

Although the laser Doppler velocimetry measurements at the adjustable exit of the common exhaust was not used for these real engine acoustic tests, it is more than likely that the previously described high-velocity regions at the common nozzle exit are still present. These regions, as for a fixed common exhaust nozzle, directly correspond to the particular configuration of the mixer lobes. This means that there are still as many high-velocity regions as there are lobes on the mixer. However, with comparison to a non-adjustable common exhaust, since tests demonstrate a significant reduction in noise, this means that the velocity of the high-velocity regions as well as the radial mean velocity are most certainly decreased when the exit of the common exhaust is increased.

As a direct consequence of the reduction of the velocities, the acoustic data shows that a mixer nozzle combined with an adjustable common exhaust is significantly quieter than the same mixer nozzle combined with a non-adjustable common exhaust or quieter than a non-mixer core nozzle. The consequence of the combination mixer nozzle and adjustable common exhaust is that the high frequency noise, a result of the mixing between the hot core flow and the cold fan flow within the structure of the common exhaust nozzle, is decreased when the exit area of the adjustable common exhaust is increased.

This technology has matured to the extent that it has been ground tested on a large commercial turbofan engine and a small turbofan engine for business aircraft. It has been also flown tested on a business aircraft. Noise reduction data is significant. However, to this point, the exit area of the common exhaust nozzle for long nacelle has been infinitely adjustable between two extreme positions.

While in some cases this infinite adjustment capability may be desirable for optimum performance, in other cases it may be sufficient to somewhat limit the adjustment capability. If the primary goal is to reduce noise at take-off, then the technology becomes much less complex and costly, hence more attractive. Because more stringent noise regulations are being imposed for certification of commercial and business aircraft, it is important that the noise suppressor system be efficient, yet attractive by its simplicity, reliability, low cost, and yet has aircraft performance enhancement capability.

A first objective of the exhaust nozzle disclosed hereinbelow is to overcome drawbacks in previous jet engine nozzles, and have variable exhaust area capabilities, for turbofan engines installed on business or commercial aircraft with short, long, or C-duct nacelles, that may or may not be equipped with a thrust reverser.

A second objective of the exhaust nozzle, for the case the nacelle is equipped with a thrust reverser, is that it can be combined with any type of reverser: fan reversers, pivoting door or target reversers.

A third objective of the exhaust nozzle, for the case the nacelle is equipped with a thrust reverser, is to allow the adjustment of the value of the throat of the exhaust nozzle independently from the thrust reverser components.

A fourth objective of the exhaust nozzle is to allow automatic full opening of the exit area of the exhaust nozzle from sea level to a pre-set altitude, and automatic full closing above the pre-set altitude.

A fifth objective of the exhaust nozzle is to reduce the noise generated by the jet exhaust at aircraft take-off.

A sixth objective of the exhaust nozzle is to optimize the performance of the engine for all phases of the flight.

Yet another object of the exhaust nozzle is to have minimal delta-weight, as well as minimal cost compared to a fixed nozzle.

While the variable exhaust area nozzle for turbofan engines disclosed hereinbelow can be installed on any type of nacelle, long, short, or C-duct, with or without thrust reversers, other objects, characteristics and advantages will become apparent from the detailed description.

BRIEF SUMMARY OF THE INVENTION

A gas turbine engine exhaust nozzle includes coaxial inner and outer conduits. The inner conduit has a main outlet at an aft end thereof, and a row of radial apertures spaced upstream from the outlet. The outer conduit has an auxiliary outlet at an aft end thereof, and surrounds the inner conduit over the apertures to form a bypass channel terminating at the auxiliary outlet. A plurality of flaps are hinged at upstream ends thereof to selectively cover and uncover corresponding ones of the apertures and selectively bypass a portion of exhaust flow from the inner conduit through the outer conduit in confluent streams from both the main and auxiliary outlets.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 6B is a perspective view of a C-duct type short nacelle for a turbofan engine; the variable nozzle is in take-off configuration.

DETAILED DESCRIPTION OF THE INVENTION

Figure 1:
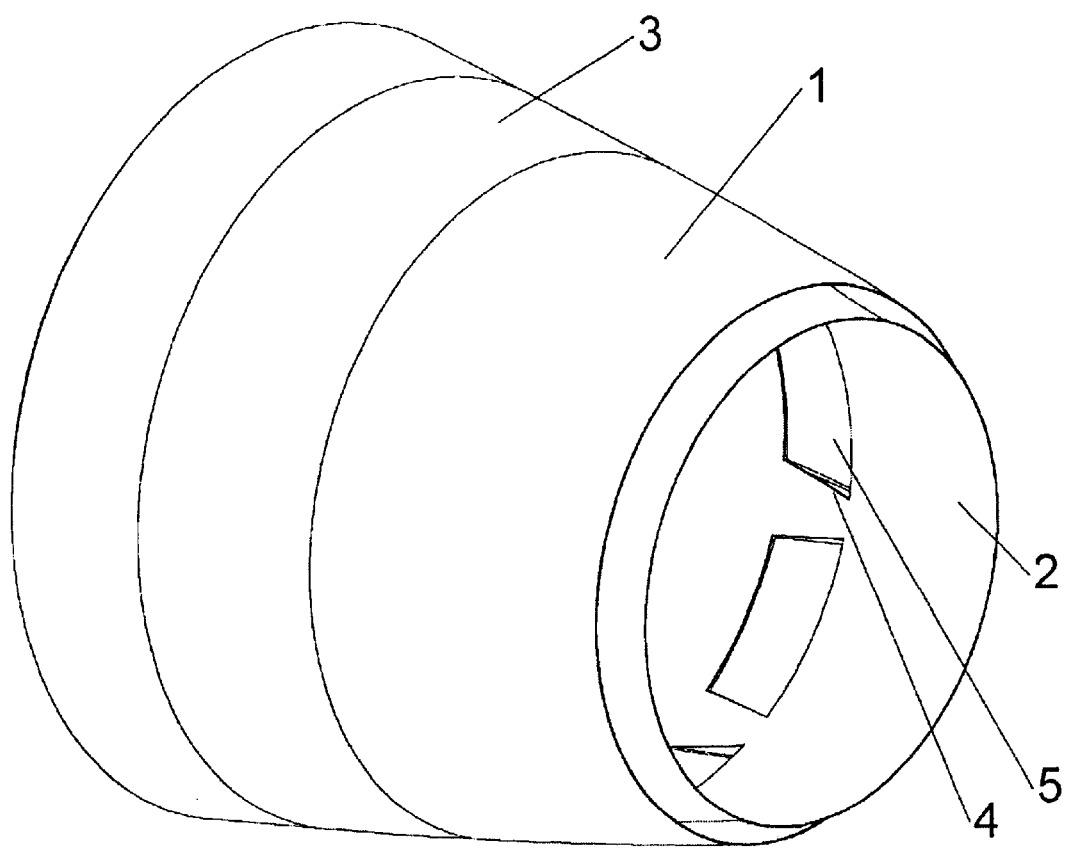
FIG. 1 is a perspective view of the rear part of a jet engine exhaust with the variable nozzle, according to one embodiment of the invention, for a long nacelle.

A variable area exhaust nozzle is configured for installation on nacelles for turbofan engines. The nacelles may or may not be equipped with thrust reversers, and they may be of the long, short, or C-duct type. When equipped with a thrust reverser, the reverser has two positions: a stow position for flight and a deploy position for decelerating the aircraft at landing.

The variable nozzle is located downstream of the thrust reverser, and can have automatic adjustment to two extreme positions: an opened position and a closed position. The opened position is for take-off from sea level to a pre-set altitude, while the closed position is for above the pre-set altitude and for cruise.

The variable nozzle is located substantially in the downstream portion of the nacelle, and the nacelle, as previously stated, may be equipped with a thrust reverser. The thrust reverser is preferably located upstream of the variable nozzle, and can be of any type: cascades, pivoting doors, or fan reverse pitch. If the nacelle does not include a thrust reverser, then the structure on which the variable nozzle is installed is stationary.

If the nacelle does include a thrust reverser of the pivoting doors type, then the structure on which the variable nozzle is installed, is also stationary. If the thrust reverser is of the cascades type, reverse pitch type, or any type that requires the axial rearward displacement of a structure for reverser purposes, then the variable nozzle is installed on that movable structure, but does not require the displacement of the movable structure for increasing or decreasing the value of the exhaust area of the nozzle.

The components and operation of the variable nozzle, according to the invention, may be the same whether the nacelle on which it is installed is or is not fitted with a thrust reverser.

The variable nozzle is fitted in the downstream end of the nacelle, and is composed of two stationary conduits that are substantially concentric: an inner conduit and an outer conduit. The inner conduit is fitted with a plurality of radial openings with associated flaps that can be opened or closed. In the case of a long nacelle, with the flaps closed, the engine exhaust gases, hot core flow and cold fan flow, are ducted only by the inner conduit and exit at its downstream end where the throat of the conduit is located.

In the case of a short nacelle, with the flaps closed, the engine fan exhaust gases, cold fan flow only, are ducted only by the inner conduit and exit at its downstream end where the throat of the conduit is located. There is no engine gas flowing between the inner conduit and the outer conduit when the flaps are closed, and the exterior surface of the outer conduit ensures aerodynamic flow continuity with the adjacent upstream exterior surface of the nacelle.

With the flaps opened, both the inner and outer conduits duct the engine exhaust gases. In addition to flowing in the inner duct, the engine gases can now flow between the inner and outer conduits. The downstream end of the outer conduit now forms a secondary or auxiliary outlet throat of the exhaust nozzle, and consequently the total engine exhaust exit area is increased.

While the outer mold line of the outer conduit ensures, at all times, the aerodynamic continuity with the outer skin of the nacelle, the inner mold line of the outer conduit may be profiled in order to establish the required area distribution for the engine gas flow when the flaps are opened. The trailing edges of the inner conduit and of the outer conduit can either be in the same or different planes. Each flap is hinged in the vicinity of the leading edge of its corresponding opening of the inner conduit. In a first embodiment, each flap is maintained in the closed position by the pressurization of an associated inflatable bladder that is connected to a pressure altitude valve and a pressure source.

From sea level to a pre-set altitude, the valve closes the pressure source and the bladder is deflated and retracted. Each flap opens by the action of the static pressure differential that is acting on it. Above the pre-set altitude, the pressure altitude valve opens the engine pressure source, and the bladder inflates, extends, and pushes against the inner mold line of the outer conduit, to close its associated flap, since the static pressure differential that is acting on it is lower than the force developed by the bladder. In a second embodiment, each flap is maintained in the closed position by at least one single effect spring-loaded actuator that may be further connected to a pressure altitude valve and a pressure source.

From sea level to a pre-set altitude, the valve closes the pressure source and each flap opens, as the static pressure differential that is acting on it is higher than what can be reacted by the internal spring of the actuator. Above the pre-set altitude, the pressure altitude valve opens the pressure source and each flap closes, as the static pressure differential that is acting on it is lower than the added force, spring plus pressure source, developed by the actuator. The pressure source is preferably pneumatic, but can be electric or hydraulic.

If the nacelle, long, short or C-duct, is equipped with a thrust reverser of the pivoting doors type, the reverser doors and the components of the variable nozzle are mounted on a stationary structure. The stationary structure is composed of a forward barrel and a rear barrel joined together by lateral beams. The resulting openings between the trailing edge of the forward barrel, the leading edge of the rear barrel and the longitudinal edges of the lateral beams define the space for the thrust reverser doors.

There are as many openings and longitudinal beams on the fixed structure as there are reverser doors, i.e., two openings and two lateral beams for a two doors reverser, four openings and four lateral beams for a four doors reverser, etc. The variable nozzle is fitted on the rear barrel and is composed of two stationary conduits that are substantially concentric: an inner conduit and an outer conduit. The inner conduit, which is also the fixed rear barrel, is fitted with a plurality of radial openings with associated flaps that can be opened or closed. The description and operation of the variable nozzle being exactly identical to that which has been explained previously, no further comments will be made for that particular configuration.

If the nacelle, long, short or C-duct, is equipped with a thrust reverser of the cascades type, then the reverser blocker doors and the components of the variable nozzle may be mounted on a cowling that can be moved axially to two positions: an upstream position for direct thrust operation and a downstream position for reverse thrust operation. When the variable nozzle of the apparatus is operated, the cowling that supports the elements of the reverser and of the variable nozzle remains stationary. It is moved downstream only when the reverser is operated.

The movable cowl is composed of an inner skin with a plurality of blocker doors hinged on it substantially in its upstream portion, an outer skin and radial as well as longitudinal frames. The blocker doors are for the thrust reverser. It is the rear part of the cowl that forms the variable nozzle of the apparatus. It is composed of two stationary conduits that are substantially concentric: an inner conduit and an outer conduit. The inner conduit, which is the rear portion of the inner skin of the cowl, is fitted with a plurality of radial openings with associated flaps that can be opened or closed. The description and operation of the variable nozzle being exactly identical to that which has been explained previously, no further comments will be made for that particular configuration.

If the nacelle, short or C-duct, is of a fan reverse pitch type, then all the components of the variable nozzle are mounted on a cowling that can be moved axially to two positions: an upstream position for direct thrust operation and a downstream position for reverse thrust operation. When the variable nozzle of the apparatus is operated, the cowling that supports the elements of the reverser and of the variable nozzle remains stationary. It is moved downstream only when the reverser is operated.

The movable cowl is composed of an inner skin, an outer skin and radial as well as longitudinal frames. It is the rear part of the cowl that forms the variable nozzle of the apparatus. It is composed of two stationary conduits that are substantially concentric: an inner conduit and an outer conduit. The inner conduit, which is the rear portion of the inner skin of the previous cowl, is fitted with a plurality of radial openings with associated flaps that can be opened or closed. The description and operation of the variable nozzle being exactly identical to that which has been explained previously, no further comments will be made for that particular configuration.

For a long nacelle, short nacelle, or a C-duct, during a pre-defined flight segment, the variable exhaust nozzle may be operated in a method of increasing the exit area of an exhaust nozzle for a turbofan engine comprising the steps of opening a plurality of flaps to allow the engine exhaust gases (hot core flow and the cold fan flow for a long nacelle, fan flow only for a short nacelle) to exit through an inner conduit and between the inner conduit and an outer conduit. If the nacelle is not equipped with a thrust reverser, then the inner and outer conduits are stationary and substantially concentric.

Still for a long nacelle, short nacelle, or C-duct, during another flight segment, the method may include decreasing the exit area of an exhaust nozzle for a turbofan engine comprising the steps of closing a plurality of flaps to allow the engine gases (hot core flow and the cold fan flow for a long nacelle, cold fan flow for a short nacelle) to exit only through the inner conduit. If the nacelle, long, short, or C-duct, is equipped with a thrust reverser, during a predefined flight segment the method may include deploying the thrust reverser for aircraft decelerating during landing. If the thrust reverser is of the pivoting doors type, then the inner and outer conduits are stationary and substantially concentric.

If the thrust reverser is of a cascades type or any type necessitating the rearward axial translation of a downstream structure with relation to a fixed upstream structure, then the inner and outer conduits are substantially concentric and form the rear part of the movable structure. However, and as explained previously, the movable structure remains stationary for increasing or decreasing of the exit area of the exhaust nozzle during forward thrust operation. The movable structure being displaced rearward for thrust reverser operation only.

The variable exhaust nozzle disclosed herein, through its unique structural components, actuation means, and methods allows nozzle area variation for the exhaust of turbofan engines for business or commercial aircraft for achieving noise reduction during take-off and for optimization of engine and aircraft performance. When the nacelle on which the variable nozzle is installed incorporates a thrust reverser, then the variable nozzle through its unique structural components, actuation means and methods allows thrust reverser deployment for aircraft deceleration at landing.

The exhaust system of the invention is described more fully as follows. Since for a nacelle equipped or not with a thrust reverser, the variable nozzle components may be the same, the following description will describe, in suitable detail, the rear part of the nacelle on which the variable nozzle is installed. It will be shown, how this variable nozzle can be combined with any type of thrust reverser.

Figure 2:
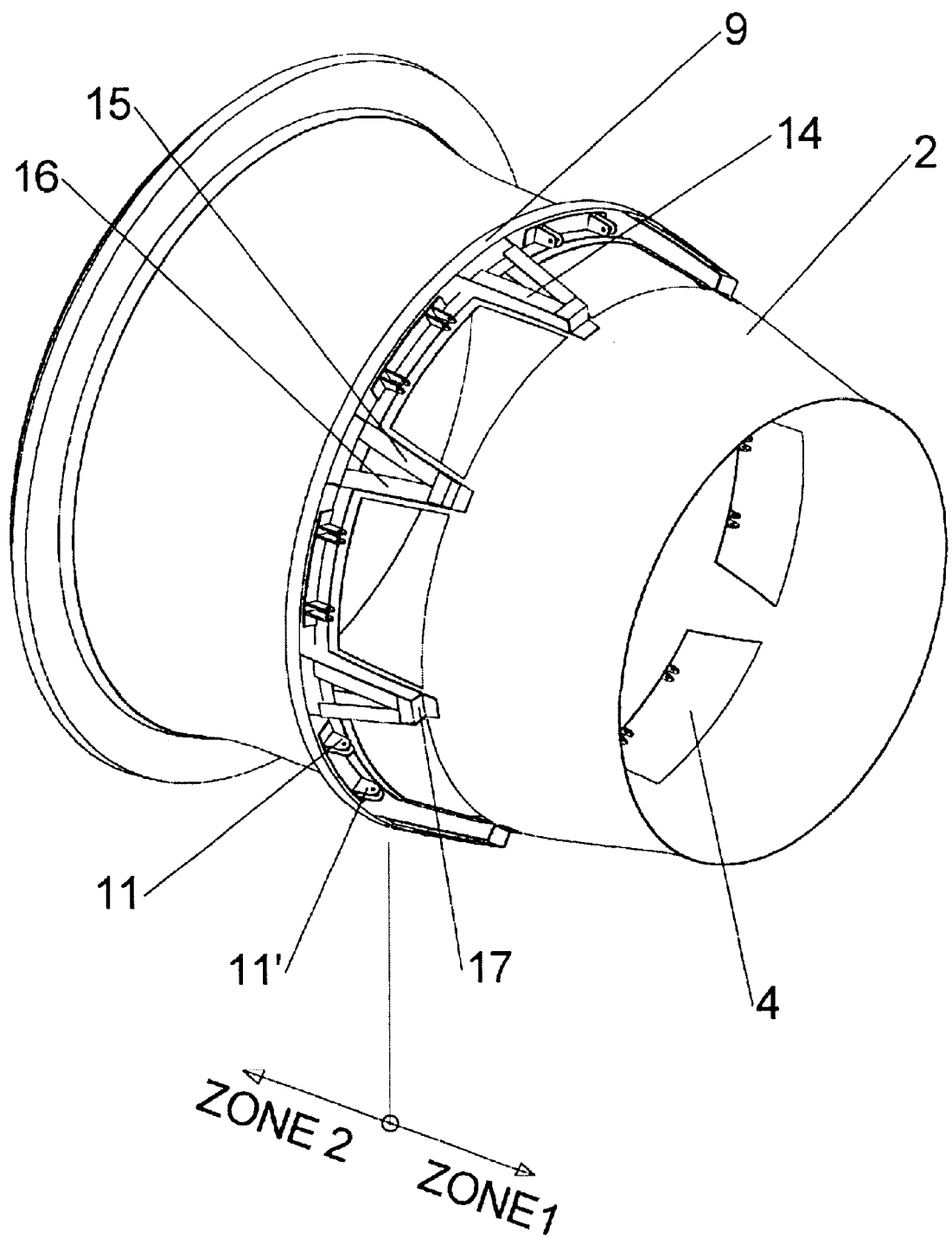
FIG. 2 is a perspective view of the inner conduit of the nozzle of FIG. 1, with the outer conduit and outer skin of the engine nacelle removed.
Figure 3:
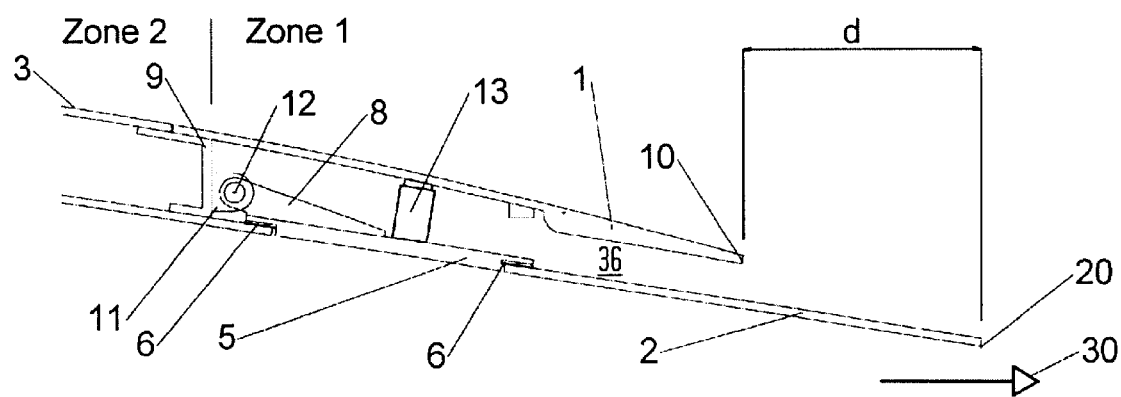
FIG. 3 is a schematic section view of the nozzle of FIG. 1 with its flaps closed; the nozzle exhaust area is at minimum value.
Figure 4:
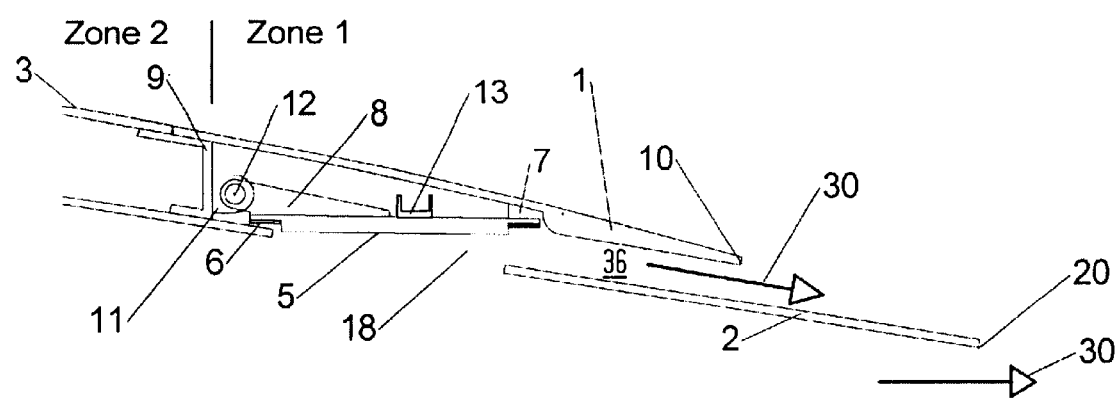
FIG. 4 is schematic section view of the nozzle of FIG. 1 with its flaps opened; the exhaust area is increased to its maximum value.
Figure 5A:
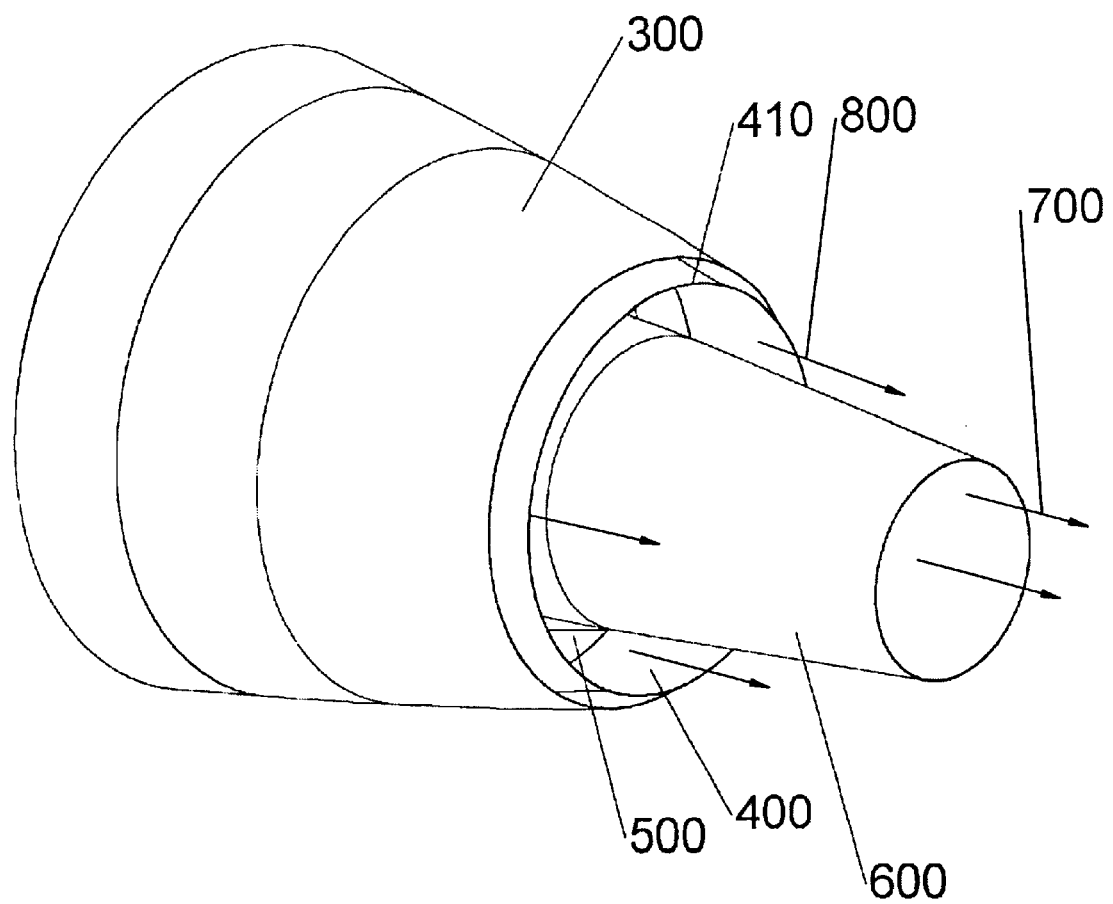
FIG. 5A is a perspective view of the rear part of a turbofan engine exhaust with the variable nozzle in cruise configuration, according to another embodiment of the invention, for a short nacelle.
Figure 6A:
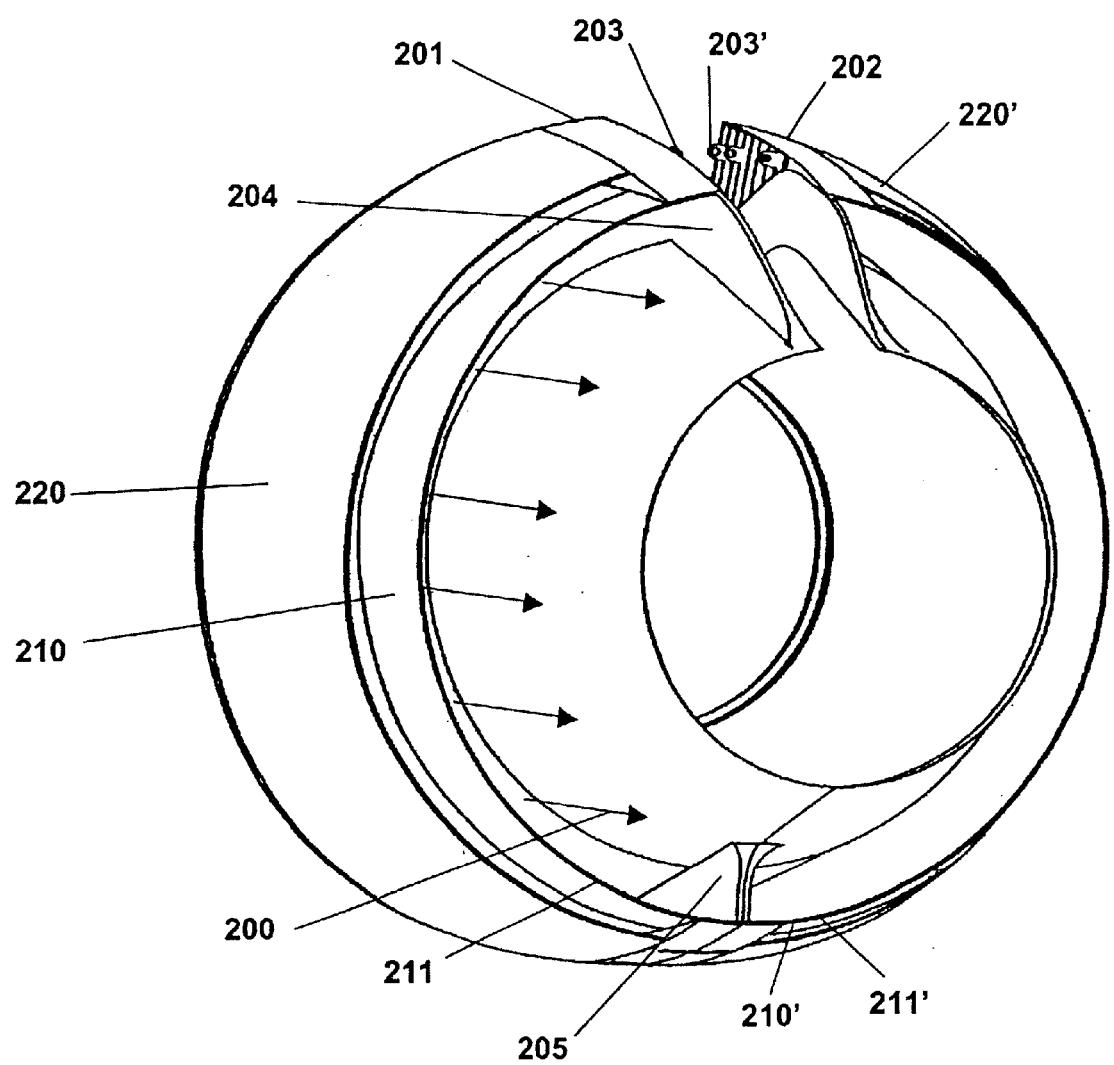
FIG. 6A is a perspective view of a C-duct type short nacelle for a turbofan engine; the variable nozzle is in cruise configuration.

The variable nozzle of the present invention can be installed on a long nacelle as shown in FIGS. 1, 2, 3, 4; on a short nacelle as shown in FIG. 5A; or on a short nacelle C-duct type as shown in FIG. 6A. If installed on a long nacelle, the operation of the variable nozzle affects the total mass flow of the turbofan engine whereas it affects only the fan flow when the nacelle is of the short type. As shown in FIGS. 1, 2 the variable exhaust area nozzle is installed on the rear part of a turbofan engine with a long nacelle, generally designated 3, and of the type comprising a fixed structure with a plurality of radial apertures or cutouts 4, a plurality of flaps 5 for closing or opening the cutouts, a suitable sealing system for sealing the cutouts when the flaps are closed, and an actuation system.

The fixed structure is the structure that provides the support for the flaps, and their actuation system. It also provides the sealing surface for the flaps, and forms the conduit for the engine gases when the flaps are closed. As illustrated in FIG. 1, the fixed structure of the variable nozzle is composed of two stationary conduits that are substantially concentric: an outer conduit 1 and an inner conduit 2. With reference to FIG. 2, a radial frame 9, attached to the inner conduit, divides the inner conduit into two zones designated zone 1 and zone 2. The inner conduit 2 is provided with a plurality of cutouts 4, all located in zone 1.

With reference to FIGS. 1, 2, 3, 7, each cutout 4 is equipped with a flap 5 that is pivotally mounted on the radial frame 9. The radial frame 9 has a series of devises 11,11' in which engage the hinges 8,8' of each associated flap 5. The outer conduit 1, and the flaps 5 with their actuation system are also located in zone 1. The radial frame 9 provides the radial support for the upstream portion of the outer conduit 1, as well as the support for the engine nacelle 3, located in zone 2. Still with reference to FIG. 2, the longitudinal frames 14 and 15, attached to the inner conduit, border the longitudinal edges of the cutouts 4.

A closeout frame 17 closes the downstream ends of two adjacent longitudinal frames 15,16. This particular longitudinal and radial framing arrangement seals the series of space 18, see FIG. 4, inside which the flaps 5 are pivotally mounted around axis 12. This prevents the engine gas flow from going into the series of spaces 19, see FIG. 7, allowing no loss of engine mass flow momentum when the flaps are opened, or crossflow at the flaps.

With reference to FIG. 3, the flaps 5 are closed, and the trailing edge 20 of the inner conduit 2 forms the main outlet or throat of the nozzle. The engine exhaust gas flow, the hot combustion gases and cold fan bypass air, schematically represented by arrow 30, are ducted by the inner conduit 2 and exit at its trailing edge outlet 20.

With reference to FIG. 4, the flaps 5 are opened, and the trailing edge 10 of the outer conduit 1 forms a secondary or auxiliary outlet or throat of the nozzle. The engine exhaust flow, hot and cold gases, schematically represented by arrows 30, are now additionally ducted in part by the outer conduit 1 and exit at its trailing edge outlet 10. As shown in FIG. 3 the trailing edge 10 of outer conduit 1 is located upstream, at a distance d from the trailing edge 20 of the inner conduit 2. While this particular arrangement has the benefit of ensuring the smallest possible outer diameter for conduit 1, and hence theoretically the smallest nacelle drag and weight, it may also generate a base area somewhere along the axial surface distance d.

Figure 3A:
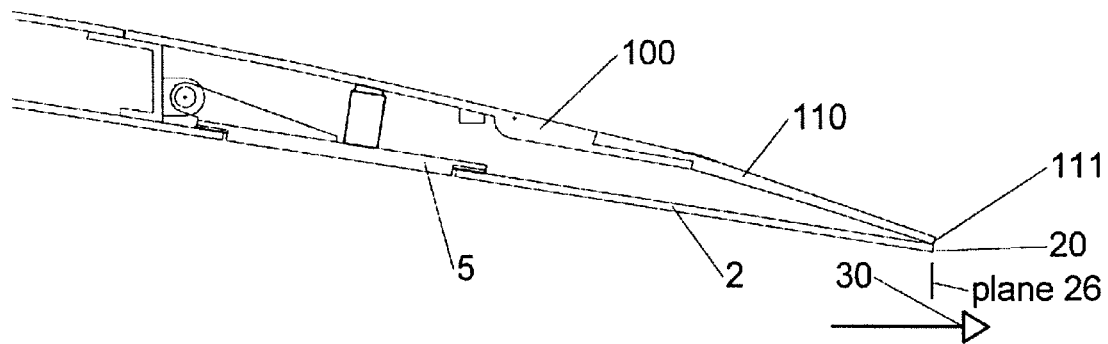
FIG. 3A is a schematic section view of another embodiment of FIG. 3, with the inner and outer conduits have their trailing edges in the same plane.

If this happens, then when the flaps 5 are closed, typical of cruise configuration, there would be an additional base drag that would be detrimental to the cruise performance of the aircraft. To avoid such drawback, FIG. 3A shows that the outer conduit is now composed of a fixed stationary part, designated 100 and a flexible skirt 110 having its upstream end attached to the downstream end of part 100 and its downstream end 111 free, but in the same plane 26 as the trailing edge 20 of the inner conduit 2. The flexible skirt 110 may be an elastomeric fabric with imbedded leaf springs having a built in spring loaded memory that maintains it in its non-expanded or contracted cruise configuration.

The previous axial distance d is now reduced to zero. The potential base drag, generated in cruise, with the arrangement of FIG. 3 is now eliminated at the expense of a limited but additional weight of the flexible skirt 110.

Figure 7:
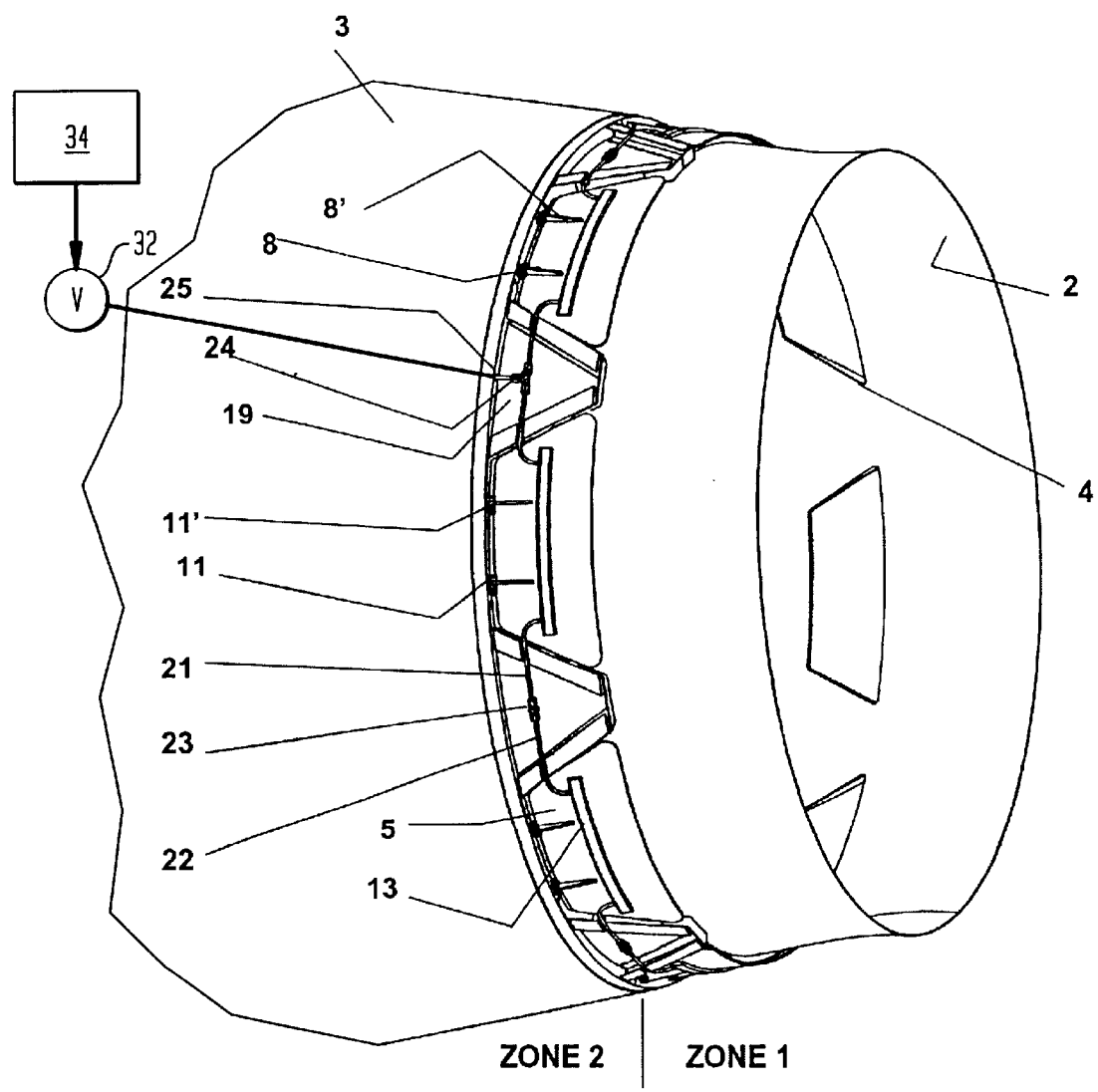
FIG. 7 is a perspective view of one embodiment of the actuation system of the variable nozzle of FIGS. 1, 3, 4, 5A, 6A.

As illustrated in FIG. 7 in accordance with one embodiment, the actuation system of the variable nozzle is composed of a series of pneumatic bladders 13. Each bladder 13 is mechanically attached to its associated flap 5, and two adjacent bladders are connected together via a pneumatic tubing arrangement 21,22.

One set of tubes 21,22 is connected to a T-type connector 24 while the remainder of each tube series 21,22 is connected together via a straight connector 23. All connectors are located in their associated space 19. The T-type connector 24 is connected via tube 25 to a pressure altitude valve 32 and a suitable pressure source 34. The series of bladders can be inflated or deflated. As explained in the background section, for noise attenuation purposes during take-off, it is desirable to increase the exit area of the throat through which the engine gases are exiting and discharged to the atmosphere.

Figure 4A:
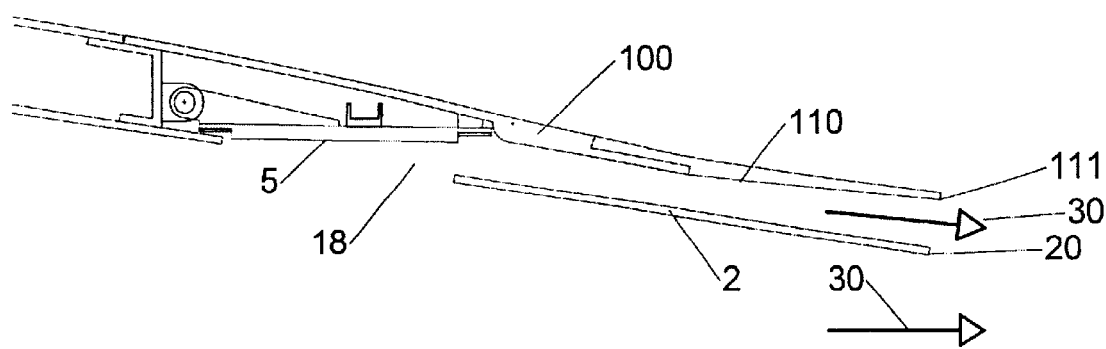
FIG. 4A is a schematic section view of the nozzle of FIG. 3A; the nozzle exhaust area is increased to its maximum value.

From sea level to a preset altitude, and as shown in FIGS. 4, 4A, the series of bladders 13 is deflated and the static pressure of the engine gases that is acting on the series of flaps 5 opens up the flaps. Each flap 5 pivots around its hinge axis 12 and reaches its fully opened position. A series of mechanical stops 7, installed on the outer conduit, ensures excellent continuity of the profiles of the flaps and the outer conduit when the flaps are opened. The series of mechanical stops 7 may alternatively be installed directly on the flaps, or there may be even situations when such series of stops is not required.

With respect to FIG. 4, when the series of flaps is opened, it uncovers the associated series of cutouts 4 of the inner conduit 2, and in addition to flowing through the inner conduit 2, the engine gases, mixed core and fan gases, 30 can now additionally flow in the annular bypass channel 36 formed between the outer and inner conduits 1,2. The total exit area for the engine exhaust flow is increased since it is now includes both the main and auxiliary nozzle outlets 20,10.

With respect to FIG. 4A, when the series of flaps is opened, the engine gases 30 flowing between the inner and outer conduits, force the flexible skirt 110 to radially expand, increasing its exit area through which the engine gases are discharged. The expanded trailing edge 111 of the flexible skirt 110 of the outer conduit 100 forms the auxiliary outlet of the nozzle. The engine gases, mixed hot and cold gases 30 are ducted by the outer conduit 100 and skirt 110 and exit at its expanded trailing edge outlet 111.

Above pre-set altitude, for cruise, and as shown in FIGS. 3, 3A, the series of bladders 13 is inflated and push on the inner mold line of the outer conduit, forcing the series of flaps to pivot around their hinge axes 12 and reach their fully closed position. The series of cutouts 4 are then covered closed by the series of flaps, and the cutouts are sealed by the seal 6 installed on and along the periphery of each flap. With respect to FIG. 3A, when the series of flaps is closed, as there is no longer any engine flow acting on the flexible skirt 110, the flexible skirt retracts to its unloaded retracted or contracted position.

The outer contour of the flexible skirt 110 of the outer conduit 100 has now returned to its cruise configuration, i.e., no base area. The exit area for the engine flow 30 is decreased, and the engine flow is now ducted only by the inner conduit 2 and exits at its trailing edge outlet throat 20.

The variable nozzle configuration for a short nacelle, see FIG. 5A, may be identical to the previous description for a long nacelle. The difference resides in the exhaust configuration of the short nacelle. As shown in FIG. 5A, the engine hot gases 700 are now exiting through exhaust pipe 600, while the engine fan air gases 800 are exiting separately and upstream. The variable nozzle, is installed on the exhaust structure of the fan flow, and affects only the exit area of the fan flow.

Figure 5B:
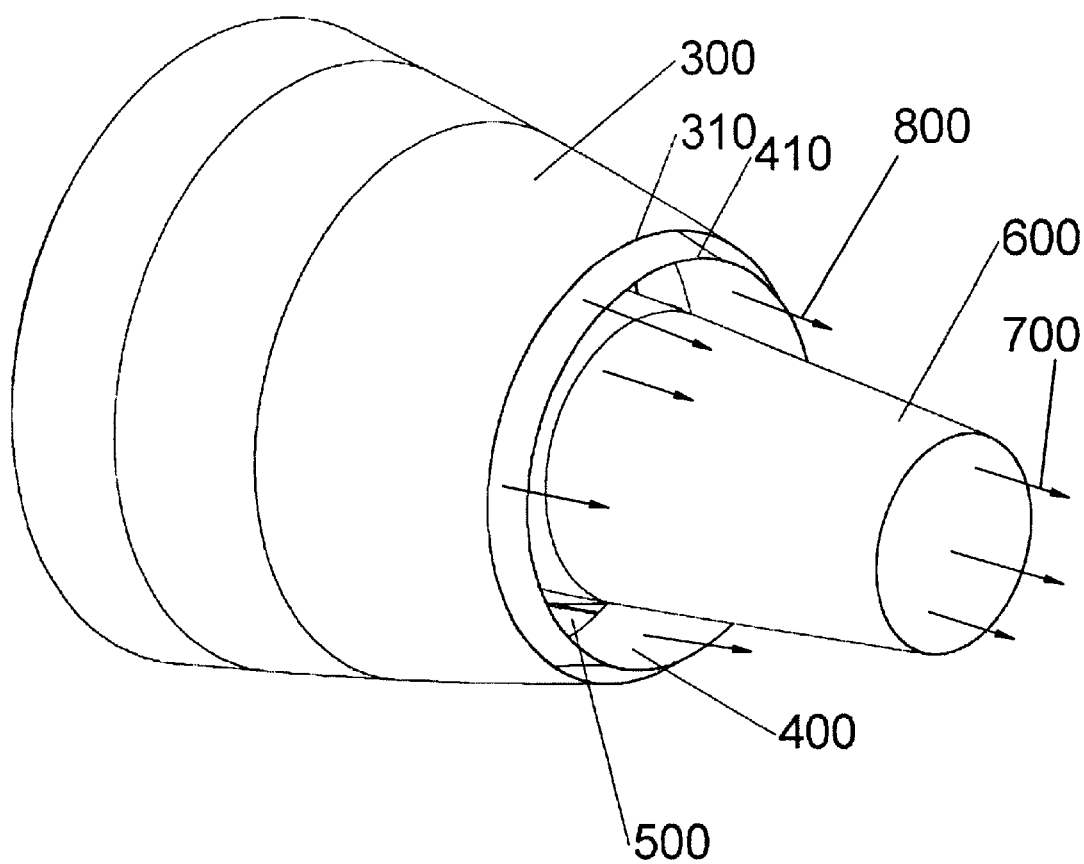
FIG. 5B is a perspective view of the rear part of a turbofan engine exhaust with the variable nozzle in take-off configuration, according to another embodiment of the invention, for a short nacelle.

As can be seen in FIG. 5A, the exhaust structure of the fan gases is composed of two substantially concentric and stationary conduits: an inner conduit 400 and an outer conduit 300. Exactly like the previous description of the variable nozzle for a long nacelle, the inner conduit is fitted with a radial frame, longitudinal frames, and a plurality of cutouts that can be covered or uncovered by associated flaps 500 pivotally mounted on the radial frame. When the series of flaps 500 is closed, see FIG. 5A, the fan gases 800 are ducted and exit through the inner conduit 400 at its trailing edge 410. When the series of flaps 500 is opened, see FIG. 5B, the outer conduit 300 ducts the fan gases, which exit at its trailing edge 310. In addition to flowing through the inner conduit 400, the fan gases are now flowing between conduits 300, 400 and consequently, the exit area for the fan gases is increased.

With reference to FIG. 6A, a perspective view of a C-duct type short nacelle for a turbofan engine installed under the wing of an aircraft (not shown), the previous description, as explained hereafter may be totally applicable. As known in the art, a C-duct is basically composed of two halves structure 201, 202, each of them being hinged in the vicinity of their 12 o'clock position via a series of hinges 203, 203' to a pylon (not shown), forming what is known as the upper bifurcation 204. Still as known in the art, both halves structure are latched together, in the vicinity of their 6 o'clock position, forming what is known as the lower bifurcation 205.

The variable nozzle may be installed in another embodiment on each half C-duct, and the fan flow, also called by-pass flow, has its nozzle throat formed either by an inner conduit 210,210' or by an outer conduit 220,220'. Like the previous description of the variable nozzle for a long nacelle, each half structure 201, 202 has its inner conduit 210,210' fitted with a radial frame, a plurality of cutouts, longitudinal frames bordering the cutouts and a plurality of flaps, all of these being identical to FIGS. 2, 3, 3A as desired.

When the flaps are closed, see FIG. 6A, the bypass fan flow represented schematically by 200 (only represented on one half structure) is only ducted by the inner conduit 210,210' of each half and exits at the trailing edge 211,211' of the inner conduit. When the flaps are opened, see FIG. 6B, the bypass flow 200 (only represented on one half structure) is now ducted by the outer conduit 220, 220' of each half 201,202 and exits at the trailing edge 221,221' of the outer conduit. Similarly to FIG. 3A, and if necessary, a flexible skirt can be fitted at the trailing edge 221,221' of the C-duct, so that when the flaps are closed, the trailing edge of the outer conduit is in the same plane as the trailing edge of the inner conduit.

The actuation system of the variable nozzle may be the same whether the variable nozzle is installed on a long nacelle, a short nacelle or a C-duct type nacelle. In the present invention, and as shown in FIG. 7, the series of flaps 5 via their two hinge arms 8,8' are hinged on their associated devises 11,11', each of the devises being supported and attached to the radial frame 9 attached to the inner conduit 2. The series of flaps 5 can either be fully opened or fully closed. Each flap is equipped with a bladder 13 in this exemplary embodiment. The bladders are connected to one another and they can be either inflated or deflated.

A pressure source 34 and a pressure altitude valve 32 control the inflating/deflating of the bladders. When the bladders are deflated, it is the static pressure of the engine gas flow that opens the flaps and maintains them opened, increasing the exit area for the engine gas flow. Consequently, the noise generated during take-off of the aircraft is decreased. When the bladders are inflated, they push on the outer conduit forcing the series of flaps to their closed position and causing the outer conduit to close and force the engine gas flow to exit through the inner conduit alone.

Consequently, the cruise performance of the aircraft is improved. This operation of the flaps is the variable nozzle area function of the apparatus. The pressurization system 34 uses preferably a pneumatic source which can be generated by an electric pump, or an engine bleed. While an automatic opening/closing of the series of flaps is envisaged through the use of a pressure source and a pressure altitude valve, a standard control and powered actuation system can be used to provide controlled movement to the series of flaps during all flight segments.

Figure 8:
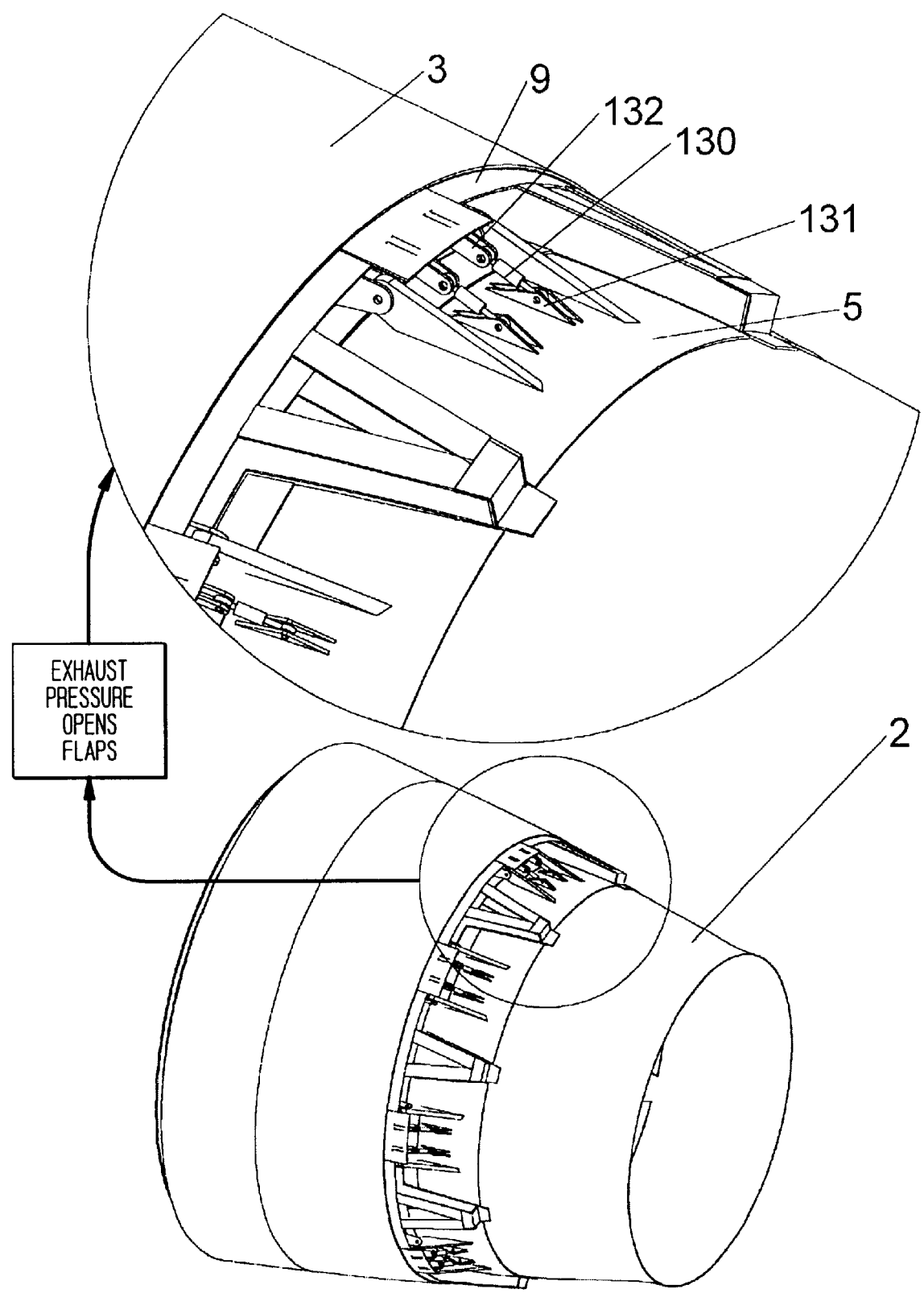
FIG. 8 is a perspective view of another embodiment of the actuation system of the variable nozzle of FIGS. 1, 5A and 6A.

FIG. 8 shows a preferred embodiment of the actuation system of the invention. Each flap 5 is connected to at least one pneumatic single effect spring loaded actuator 130 having one end pivotally attached to clevis 131 which is part of the flap, while its other end is pivotally attached to clevis 132 which is attached to radial frame 9. The actuators 130 preferably include compression springs biasing closed the flaps 5 to cover their respective cutouts 4. The flaps open automatically as the exhaust pressure inside the inner conduit exceeds the spring force and external pressure therearound, for example during aircraft take-off operation.

In an alternate embodiment, all actuators 130 may be connected to each other via tubing similar to that which is shown in FIG. 7. A pressure source 34, via a pressure altitude valve 32, supplies pneumatic pressure to the actuators to either retract or extend their piston rods. This in turn opens or closes the flaps. From sea level to a pre-set altitude, the pressure altitude valve closes the pressure supply source, and the engine flow static pressure acting on the flaps open them; above pre-set altitude, the valve opens and the actuators are pressurized to extend their piston rods closing the flaps.

Figure 12:
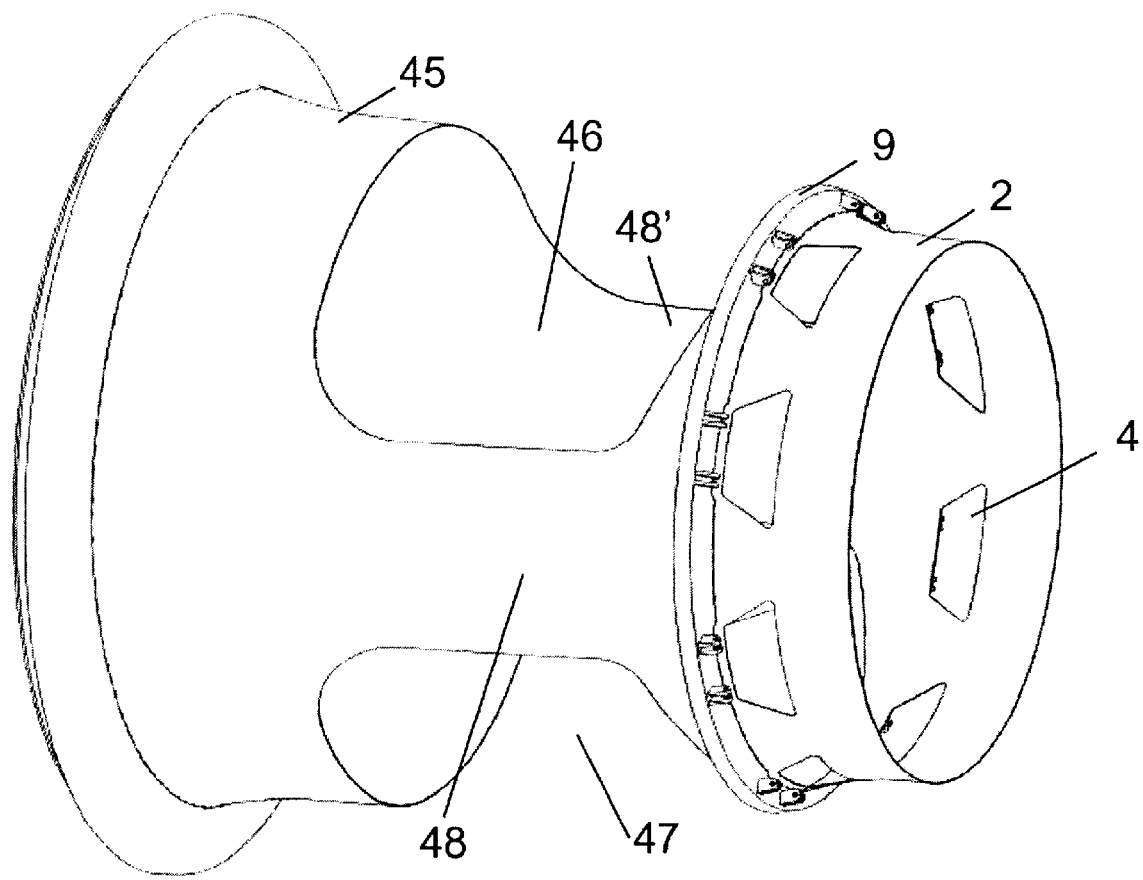
FIG. 12 is a schematic perspective view of the inner conduit of the nozzle of FIG. 9 showing the cutouts for the reverser and for the variable nozzle.
Figure 13:
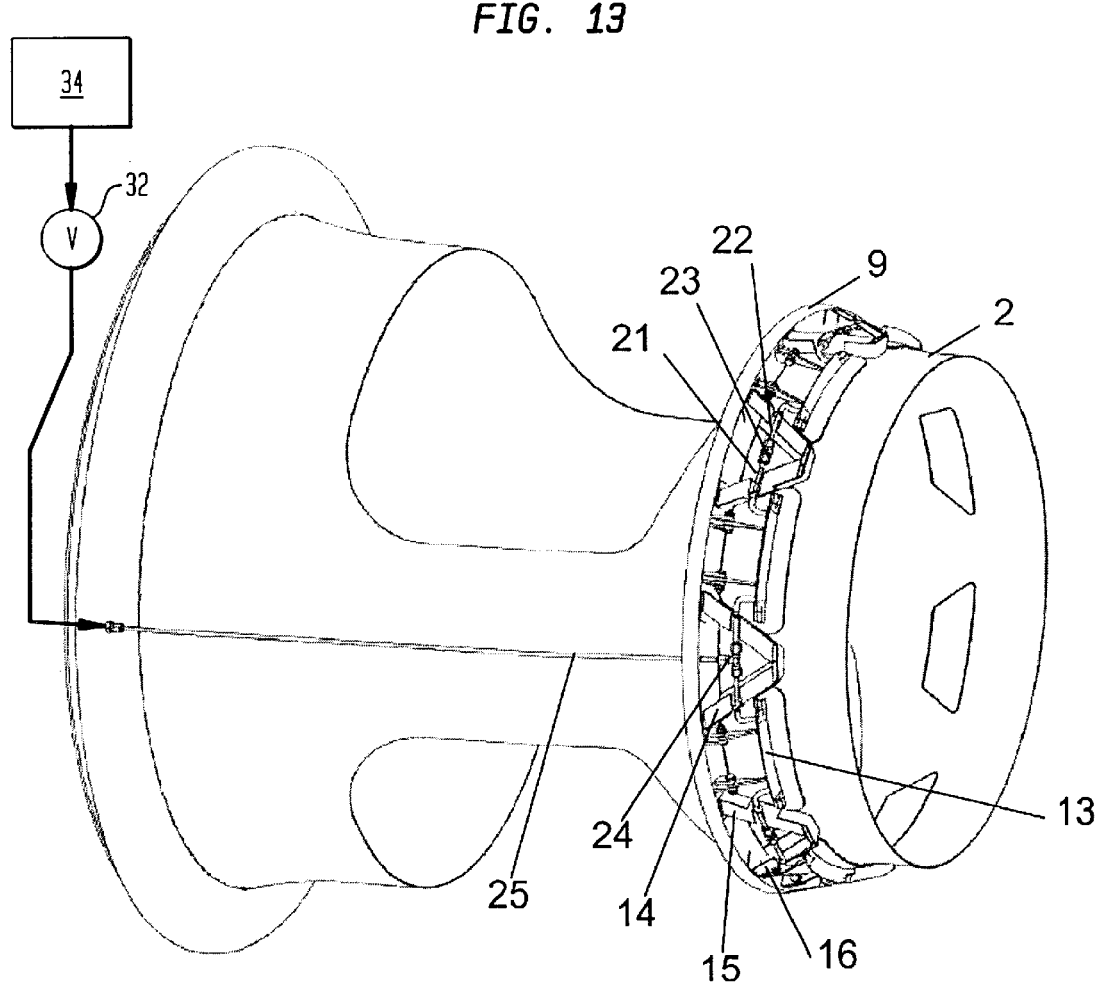
FIG. 13 is a schematic perspective view of the inner conduit of the FIG. 12 with the components of the variable nozzle installed.
Figure 14:
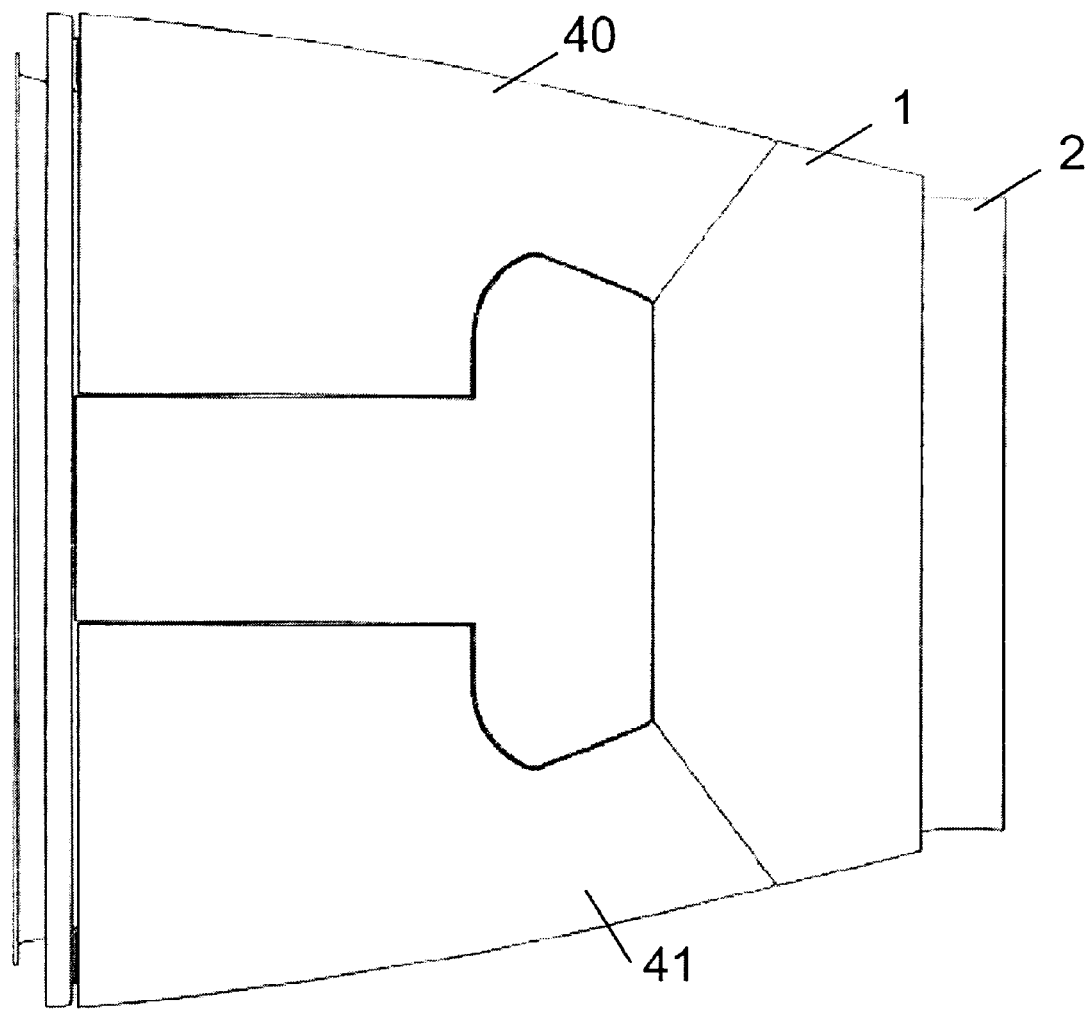
FIG. 14 is a side view of the of the nacelle of FIG. 9 with two pivoting thrust reverser doors in the stow position.

When the nacelle is equipped with a thrust reverser of the pivoting doors type as shown in FIGS. 9, 10, 11, 14, 15, 16, 17, and for all type of nacelles: long, short, or C-duct, the reverser doors and the components of the variable nozzle are preferably mounted on a stationary structure. The stationary structure as shown in FIG. 12, is composed of a forward barrel 45 and a rear barrel 2, defining the inner conduit 2, joined together by lateral beams 48,48'. The resulting openings 46, 47 between the trailing edge of the forward barrel, the leading edge of the rear barrel and the longitudinal edges of the lateral beams define the space for the thrust reverser doors 40.

There are as many openings and longitudinal beams on the fixed structure as there are reverser doors, i.e., two openings and two lateral beams for a two doors reverser, four openings and four lateral beams for a four doors reverser, etc. The thrust reverser doors are hinged on the stationary conduit, and when they are in their stowed or closed position, they close their associated opening of the stationary structure, ensuring aerodynamic internal flow continuity between the forward barrel, the rear barrel and the lateral beams.

As can be seen in FIGS. 9, 9A, 9B, 10, 10A, 10B, 12, 13, 14, 15 the variable nozzle is fitted on the previous described rear barrel 2 and is composed of the same two stationary conduits substantially concentric: an inner conduit 2 and an outer conduit 1. The inner conduit 2, which is the fixed rear barrel, is fitted with a plurality of radial openings 4 with associated flaps 5 that can be opened or closed. As the description and operation of the variable nozzle may be totally identical to that which has been described previously in reference to FIGS. 1, 2, 3, 3A, 4, 4A, no further comments will be made on that aspect.

Figure 9:
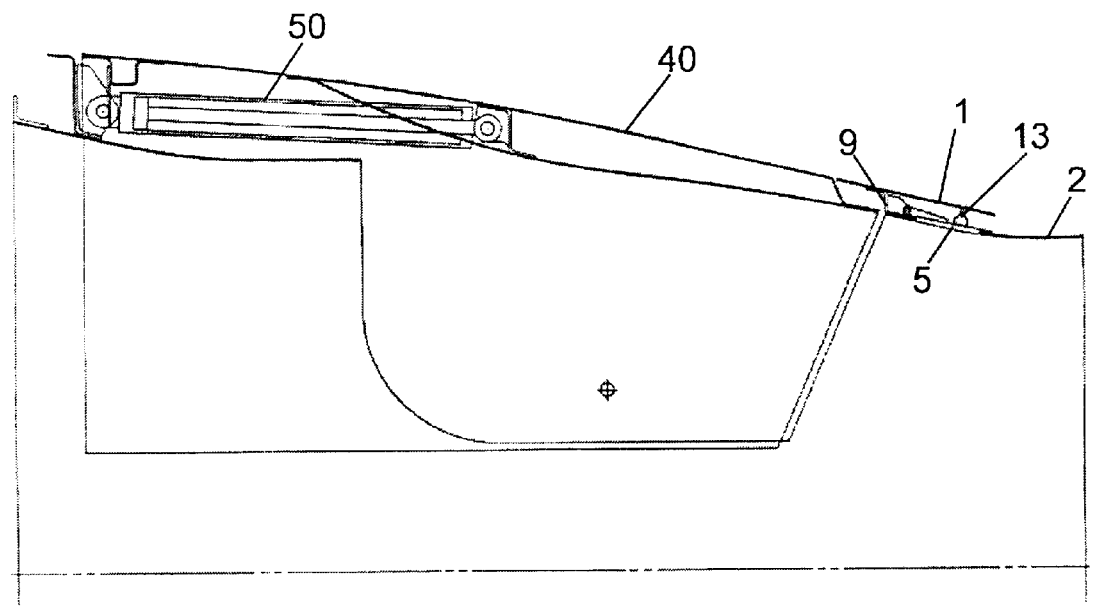
FIG. 9 is a schematic view of the rear part of a long nacelle with a pivoting doors thrust reverser in the stowed configuration and the variable nozzle according to another embodiment of the invention.
Figure 9A:
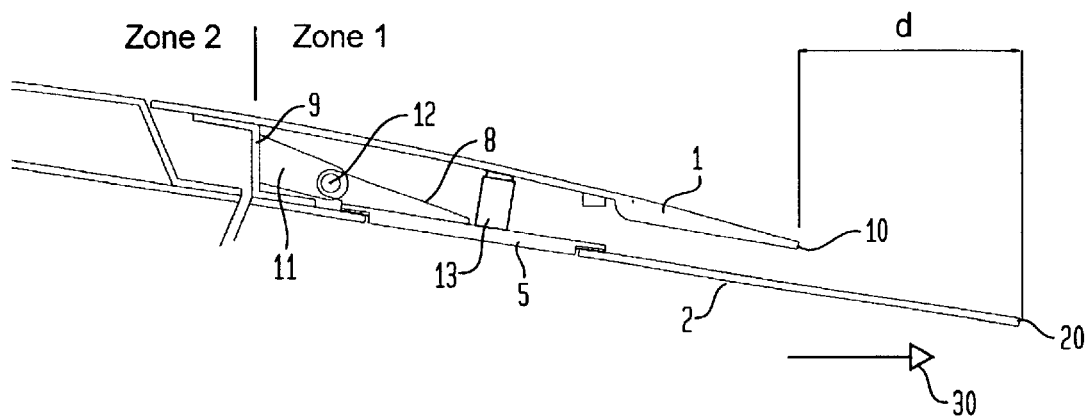
FIG. 9A is a schematic view of the variable nozzle portion of FIG. 9 with the thrust reverser stowed and the flaps of the variable nozzle closed; the nozzle exhaust area is at minimum value.
Figure 9B:
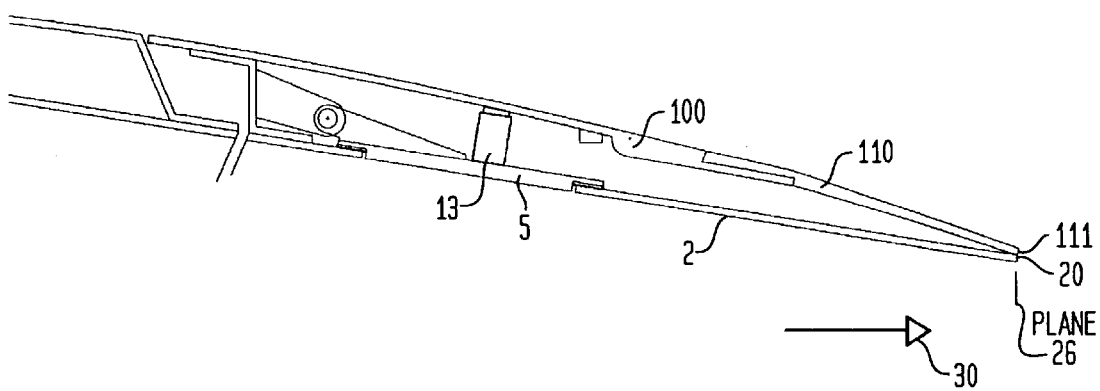
FIG. 9B is a schematic view of another embodiment of the variable nozzle portion of FIG. 9; the inner and outer conduits have their trailing edges in the same plane.
Figure 10:
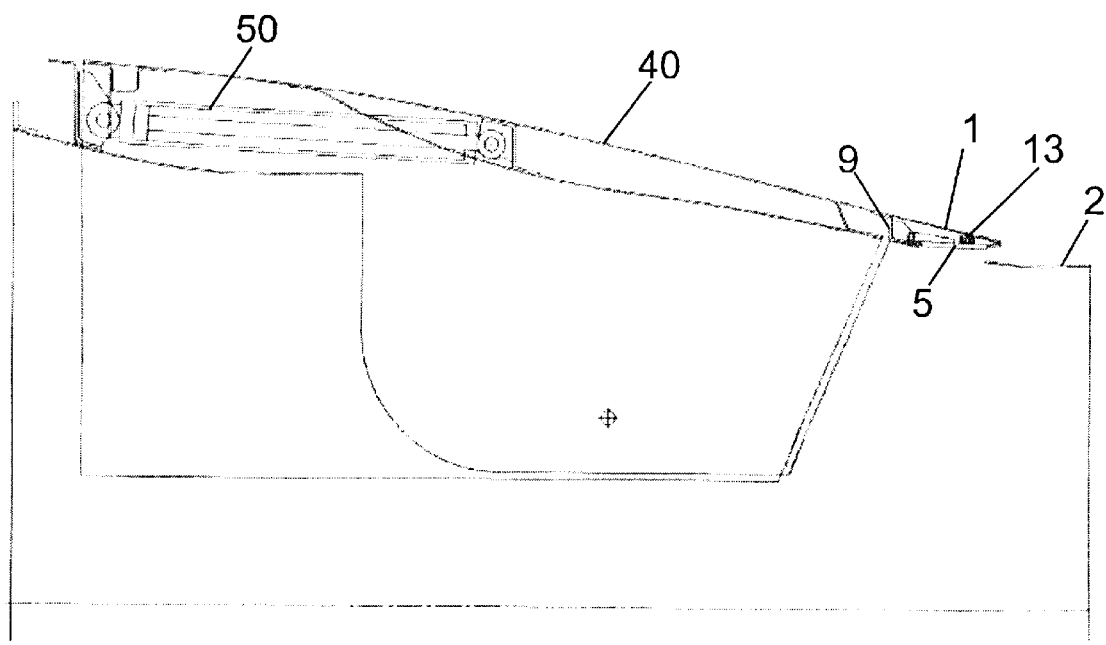
FIG. 10 is a schematic view of the rear part of FIG. 9 with the thrust reverser stowed and the flaps of the variable nozzle opened; the nozzle exhaust area is at maximum value.
Figure 10A:
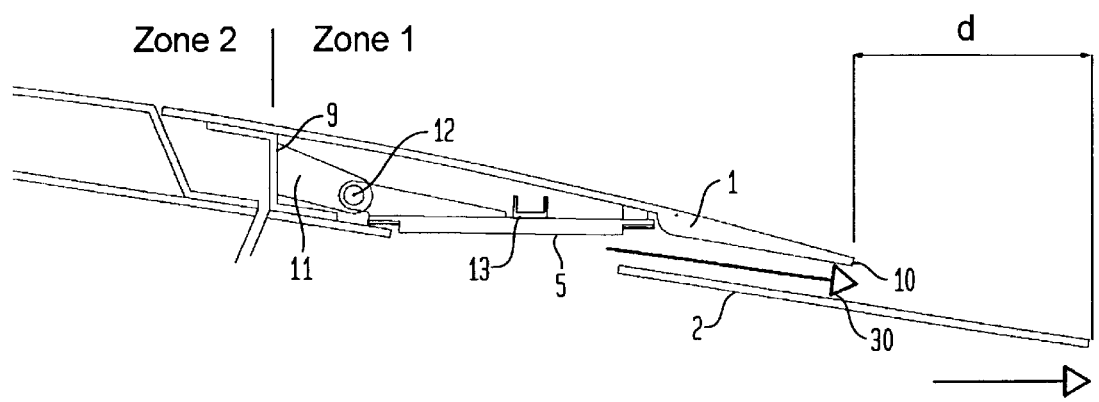
FIG. 10A is a schematic view of the variable nozzle portion of FIG. 10 with the thrust reverser stowed and the flaps of the variable nozzle opened; the nozzle exhaust area is at maximum value.
Figure 10B:
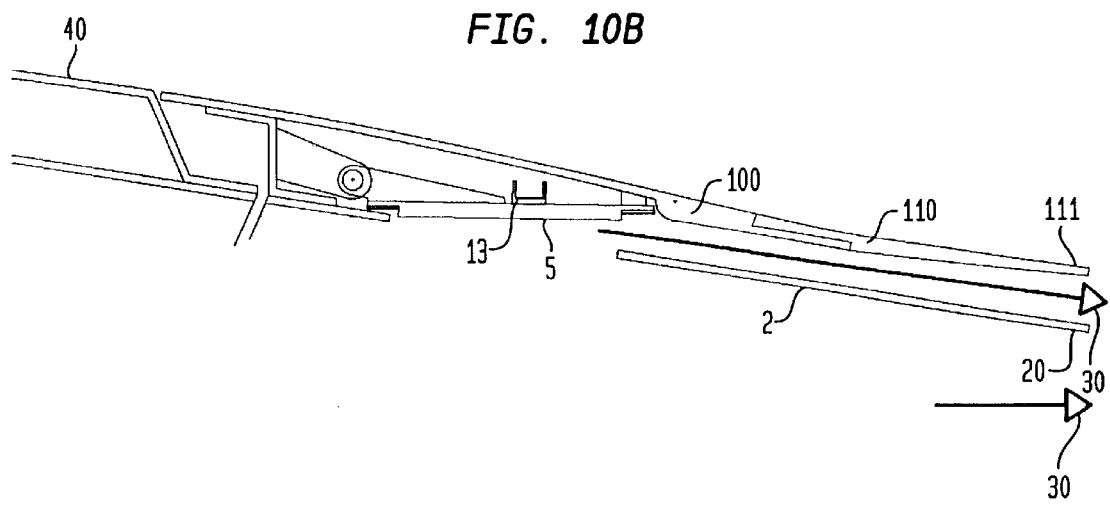
FIG. 10B is a schematic view of the nozzle of FIG. 9B; the nozzle exhaust area is at maximum value.
Figure 11:
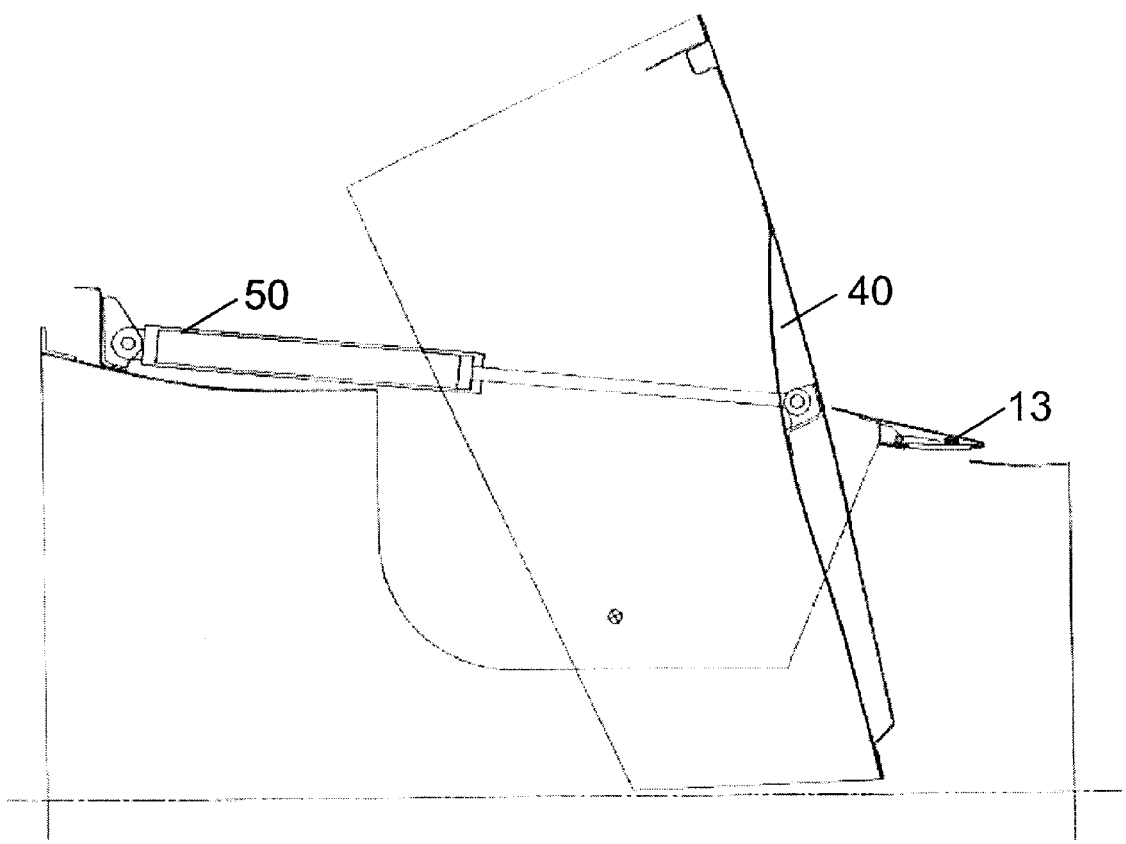
FIG. 11 is a schematic view of the nozzle of FIG. 9; the pivoting doors thrust reverser is deployed.

As can be seen in FIGS. 9, 9A, 9B, 10, 10A, 10B, 11, the components and operation of the pivoting doors thrust reverser is totally independent of those of the variable nozzle. In FIGS. 9, 9A, 9B, the thrust reverser doors 40 are in their stow position and the series of flaps 5 of the variable nozzle are maintained closed by the series of bladders 13. In FIGS. 10, 10A, 10B the thrust reverser doors 40 are still in their stow position while the series of bladders 13 is deflated. This allows the series of flaps 5 to open under the effect of the engine static pressure acting on them.

Figure 15:
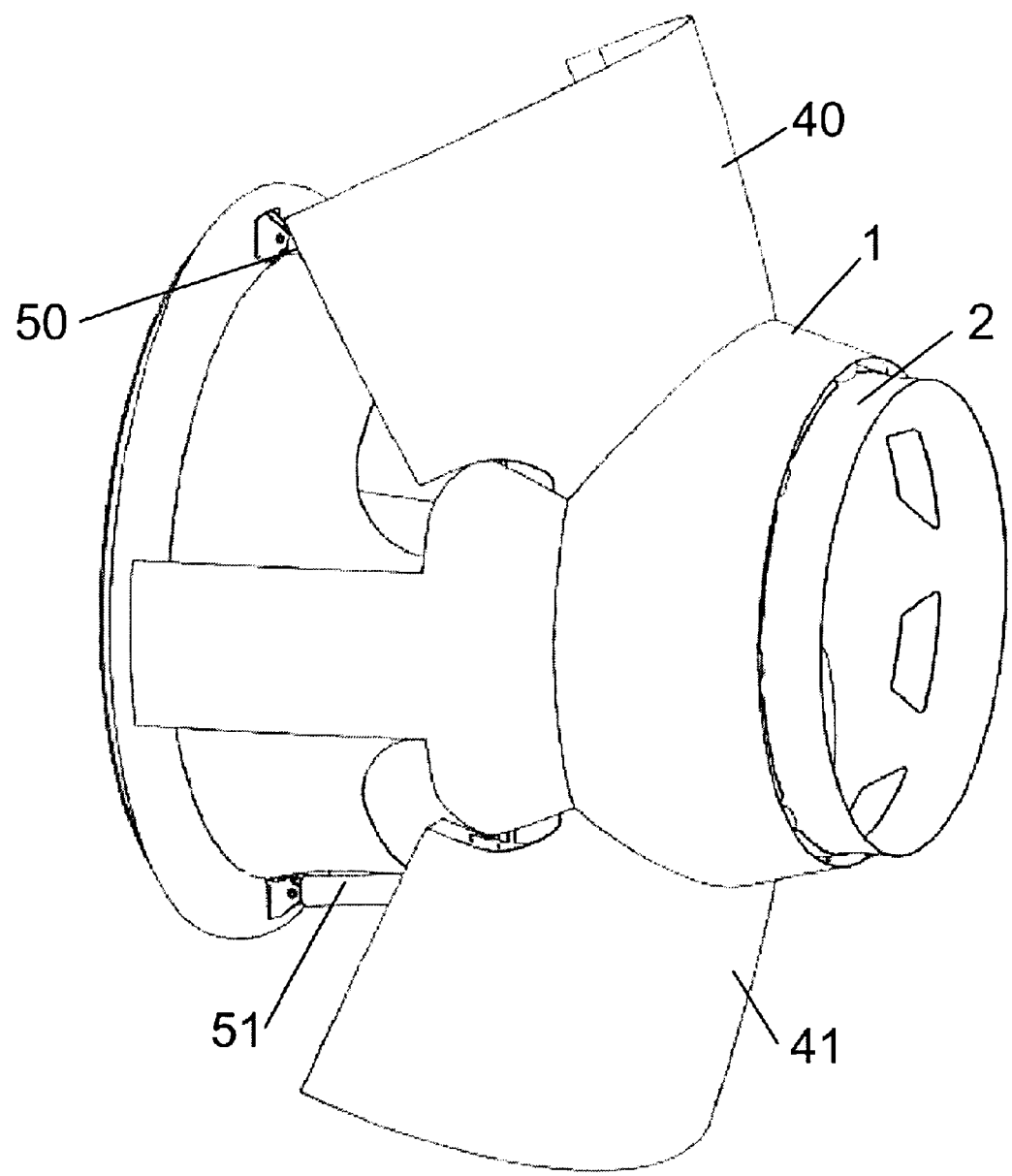
FIG. 15 is a perspective view of the nacelle of FIG. 14 with the pivoting thrust reverser doors in the deploy position.

As shown in FIGS. 9, 10 the variable nozzle is controlled, as explained before in reference to FIG. 7, by a series of bladders that can be inflated or deflated, while the thrust reverser doors are positioned to their stow or deploy positions by actuators 50. While FIG. 15 shows that each reverser door 40,41 is controlled by its own actuator 50,51 that is attached substantially to the center of each of the reverser door, it is clear that, without changing the spirit of this invention, the actuators can be located at any other position, like for example between the reverser doors (see actuators 52 in FIG. 24). In such case, there would be associated links connecting each actuator to each of the reverser doors.

Figure 16:
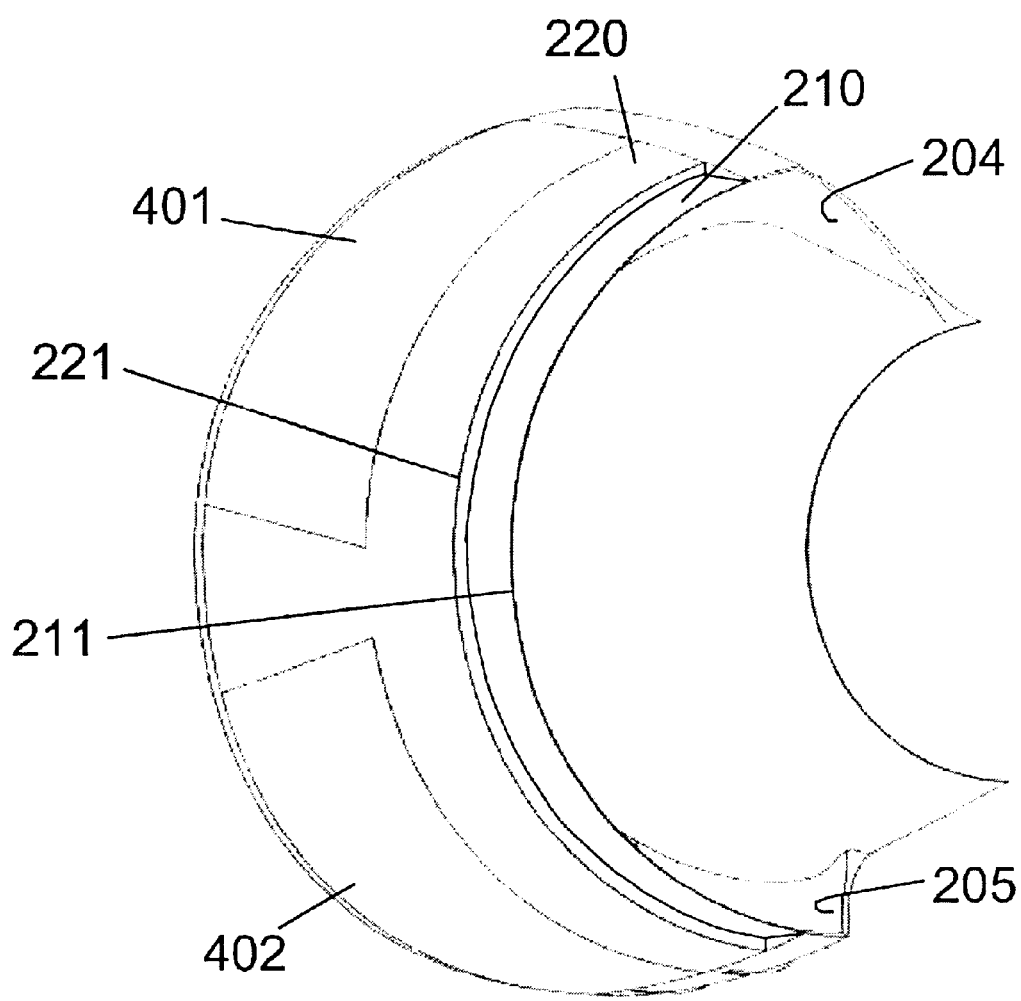
FIG. 16 is a schematic perspective view of a half C-duct type short nacelle, according to another embodiment of the invention, with two pivoting thrust reverser doors in the stow position.
Figure 17:
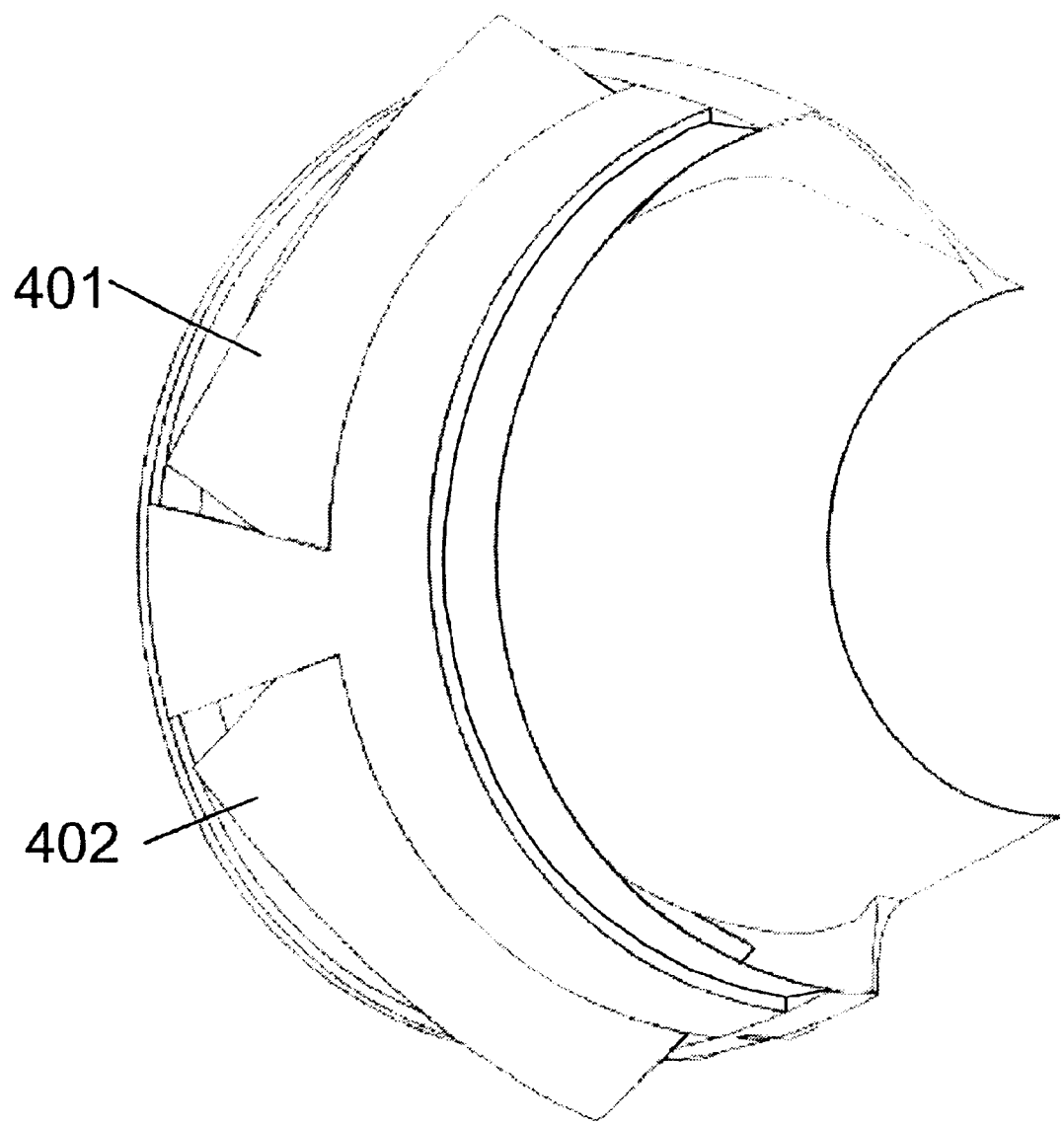
FIG. 17 is a perspective view of the nacelle of FIG. 16 with the pivoting doors in the deploy position.

With reference to FIG. 16, the variable nozzle is installed on the rear part of half of a C-duct type nacelle with a two pivoting doors type reverser, i.e., four pivoting doors total for the complete C-duct. In this arrangement the variable nozzle description and operation may be exactly identical to that which has been described previously and more particularly with reference to FIGS. 6A, 6B. The only difference with FIGS. 6A, 6B is that the half C-duct is fitted now with two pivoting doors 401, 402 for thrust reverser purpose in addition to the variable nozzle components. FIG. 17 shows the pivoting doors 401, 402 in their deployed position.

For all types of nacelles, long, short or C-duct and for cascades type reversers, and with reference to FIGS. 18A, 18B, 18C, 18D, 19A, 19B, the series of blocker doors 216, and the components of the variable nozzle are mounted on a cowling 218, 220 that can be moved axially to two positions: an upstream position (FIGS. 18A, 18B, 18C, 18D) for direct thrust operation and a downstream position (FIGS. 19A, 19B) for reverse thrust operation.

As explained previously, when the variable nozzle of the apparatus is operated, the cowling 218, 220 that supports the elements of the variable nozzle remains stationary, FIGS. 18A, 18B, 18C, 18D. It is moved downstream only when the reverser is operated in order to deploy the blocker doors 216 and uncover the series of cascades 215 so that the fan engine gases 30 can be directed forward. The movable cowl is composed of an inner skin 218 with a plurality of blocker doors 216 hinged on it, an outer skin 220 and radial as well as longitudinal frames (not shown).

The blocker doors are for the thrust reverser located in Zone 2. It is the rear part, referred as Zone 1 of the cowl that forms the variable nozzle of the apparatus. It is composed of two stationary conduits that are substantially concentric: an inner conduit and an outer conduit. The inner conduit 210, which is the rear portion of the inner skin 218 of the previous cowl, is fitted with a plurality of radial openings with associated flaps 5 that can be opened or closed. The outer conduit 220' is substantially the rear portion of the outer skin 220 of the movable cowl.

Figure 18A:
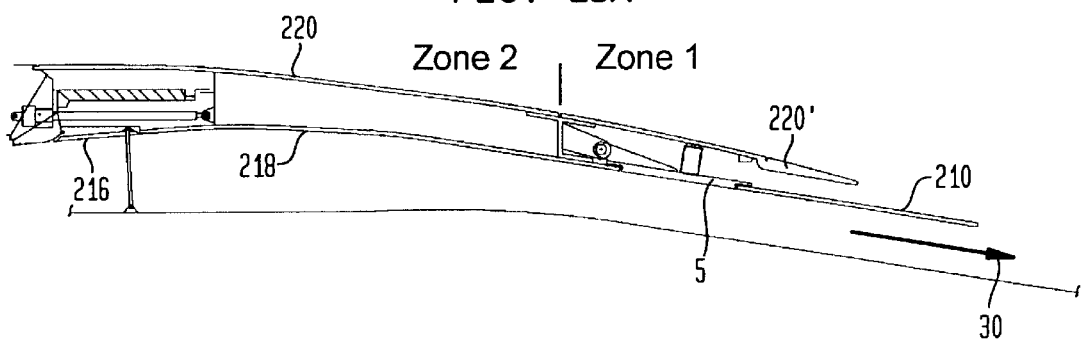
FIG. 18A is a schematic view of the variable nozzle in another embodiment installed on a short nacelle equipped with a cascades type reverser; the flaps of the variable nozzle are closed and the cascades reverser is stowed.
Figure 18B:
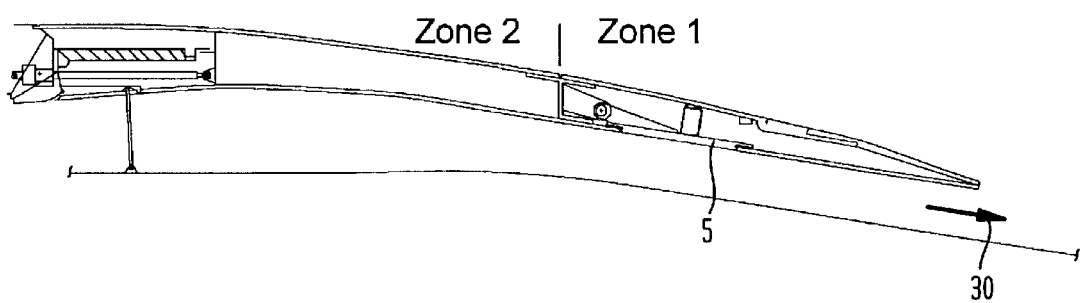
FIG. 18B is another embodiment of the variable nozzle of FIG. 18A.
Figure 18C:
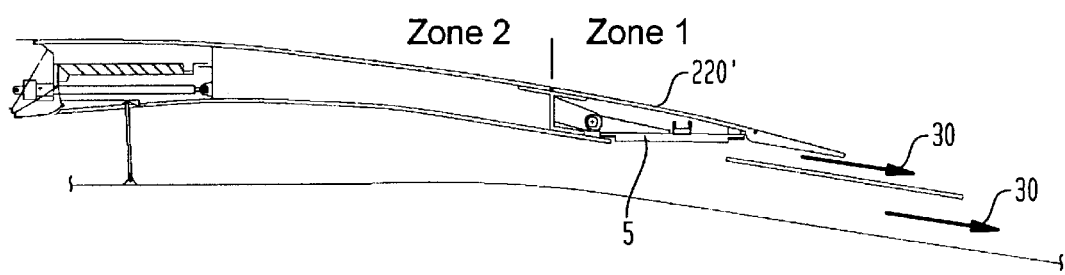
FIG. 18C is a schematic view of the variable nozzle of FIG. 18A with the flaps opened and the cascades reverser stowed.
Figure 18D:
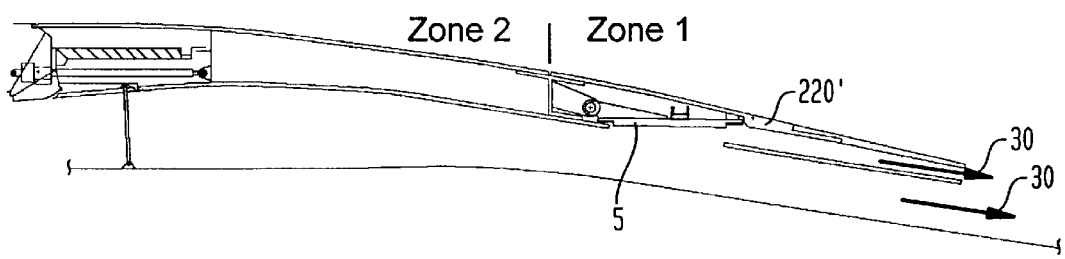
FIG. 18D is a schematic view of the variable nozzle of FIG. 18B with the flaps opened.
Figure 19A:
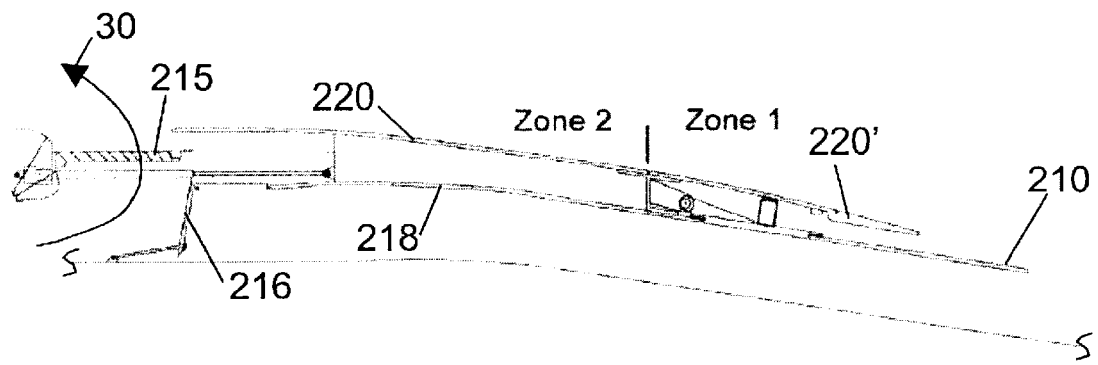
FIG. 19A is a schematic view of the nacelle of FIG. 18A with the cascades reverser deployed.
Figure 19B:
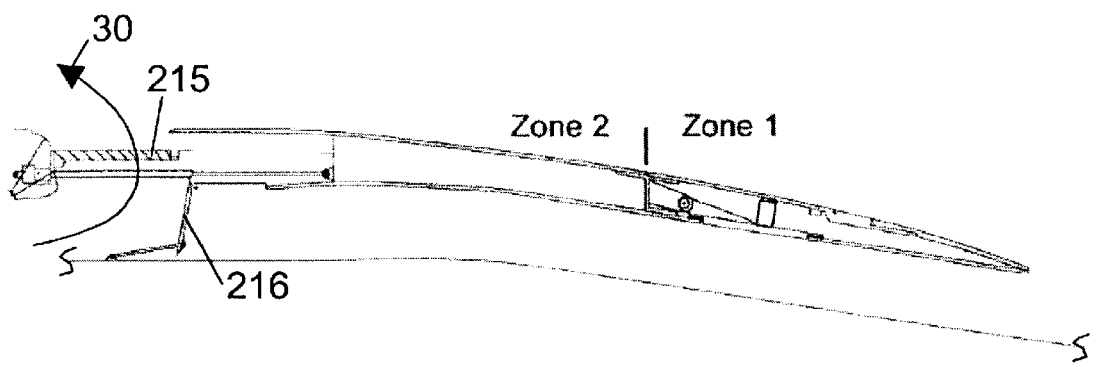
FIG. 19B is a schematic view of the nacelle of FIG. 18B with the cascades reverser deployed.
Figure 20A:
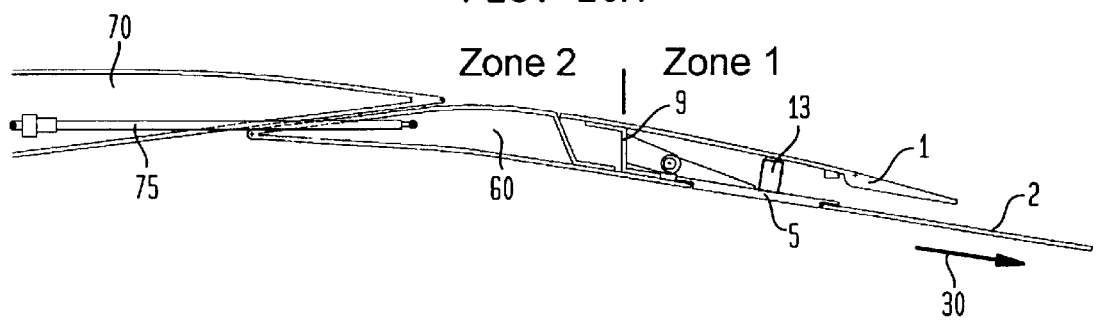
FIG. 20A is a schematic view of a C-duct type nacelle for a fan reverse pitch type reverser and a variable nozzle in its small exit area position.
Figure 20B:
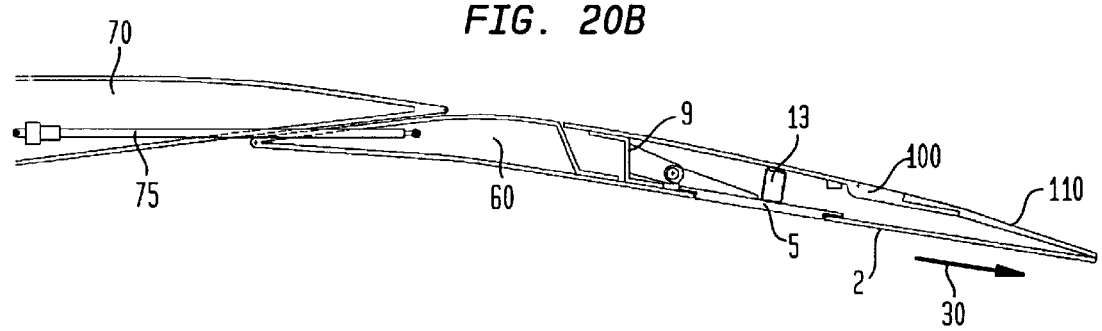
FIG. 20B is a schematic view of another embodiment of FIG. 20A.
Figure 21A:
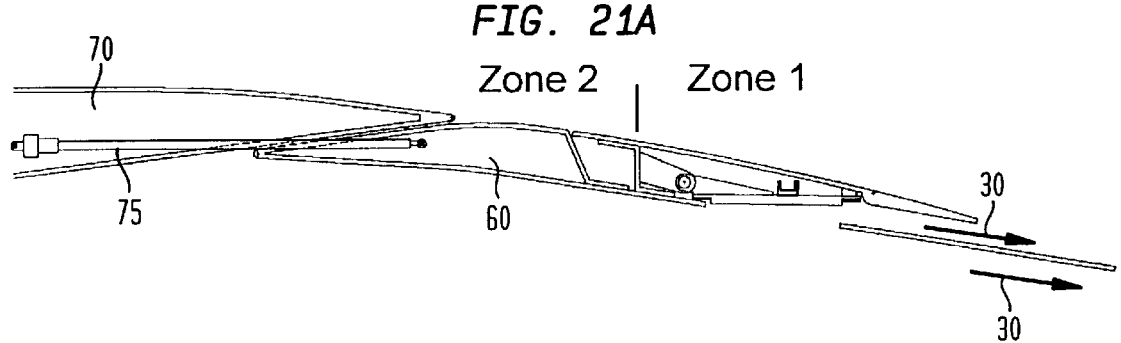
FIG. 21A is a schematic view of the nozzle of FIG. 20A, the exit area of the nozzle is at maximum value.
Figure 21B:
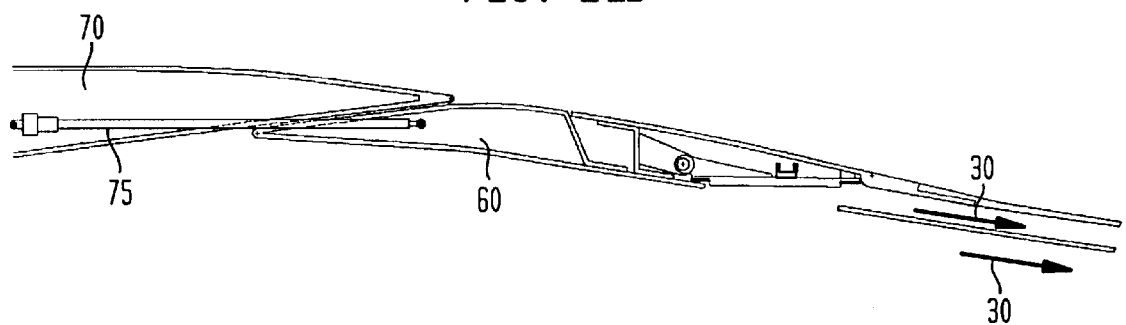
FIG. 21B is a schematic view of another embodiment of the nozzle of FIG. 21A.

FIGS. 18A, 18B show that the flaps 5 of the variable nozzle are closed and consequently, as explained in detail previously, the fan exhaust gases 30 are ducted by the inner conduit 210, meaning that the value of the exit area for the fan gases is minimum. This is the configuration of the apparatus from a pre-set altitude and cruise. With reference to FIGS. 18C, 18D the flaps 5 are opened and the apparatus is in its take-off configuration up to a pre-set altitude.

The fan gases 30 are now also ducted by the outer conduit 220', meaning that the value of the exit area for the fan gases has been increased. As the description and operation of the variable nozzle may be totally identical to that which has been described previously, no further comments will be made on that aspect. The components and operation of the cascades type thrust reverser is totally independent of those of the variable nozzle, and again, the movable cowl remains stationary in its upstream position, when the variable nozzle is operated.

If the reverser is of the reverse fan pitch type (FIGS. 20A, 20B, 21A, 21B, 22A, 22B), then like for a nacelle that is fitted with a cascades type reverser, all the components of the variable nozzle are mounted on an aft cowling 60 that can be moved axially to two positions: an upstream position (FIGS. 20A, 20B, 21A, 21B) for direct thrust operation and a rearward downstream position (FIGS. 22A, 22B) for reverse thrust operation.

As explained previously, when the variable nozzle of the apparatus is operated, the cowling 60 that supports the elements of the variable nozzle remains stationary. It is moved downstream only when the fan is put in its reverse pitch mode for reverser operation. The movable cowl is composed of an inner skin, an outer skin and radial as well as longitudinal frames. It is the rear part, referred as Zone 1, of the cowl that forms the variable nozzle of the apparatus, and all components of the variable nozzle are located in the Zone 1. It is composed of two conduits that are substantially concentric: an inner conduit 2 and an outer conduit 1.

The inner conduit, which is the rear portion of the inner skin of the previous cowl 60, is fitted with a plurality of radial openings with associated flaps 5 that can be opened or closed. The outer conduit is substantially the rear portion of the outer skin of the cowling. As the description and operation of the variable nozzle may be totally identical to that which has been described previously, no further comments will be made on that aspect. As can be seen in FIGS. 20A, 20B, 21A, and 21B the components and operation of the fan reverse pitch type thrust reverser are totally independent of those of the variable nozzle, with variable nozzle components identical to FIGS. 5A, 5B, 6A, 6B.

Figure 22A:
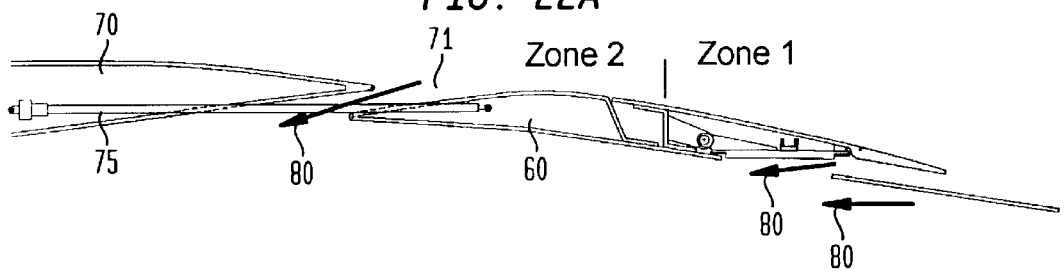
FIG. 22A is a schematic view of the nacelle of FIG. 20A in its reverse pitch position.
Figure 22B:
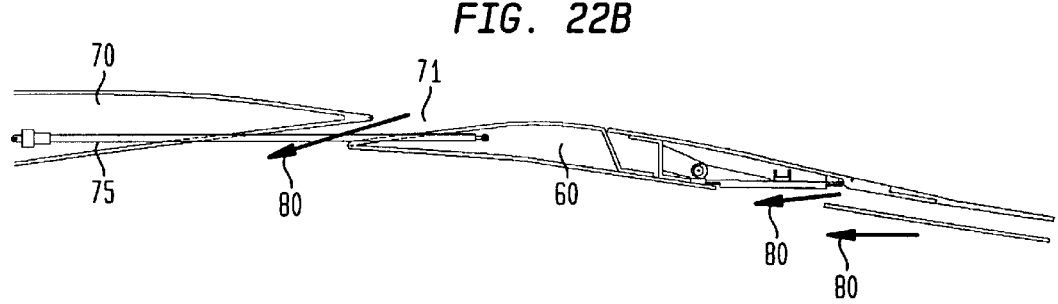
FIG. 22B is a schematic view of another embodiment of the nacelle of FIG. 22A.

As depicted in FIGS. 22A, 22B, when the aft cowling 60 is moved rearward and axially by actuating means 75, it separates from the fixed upstream cowl 70 in order to open an inlet 71 for reverse mode operation. In this configuration, with the pitch of the fan reversed, air flows in the direction of arrows 80 through the opening 71 and through the rear end of the nozzle. Also shown in FIGS. 22A, 22B, the variable nozzle is in its maximum exit area position when the movable cowling 60 is in its reverse position. This presents the advantage of re-directing more air forward when the pitch of the fan is reversed.

Figure 23:
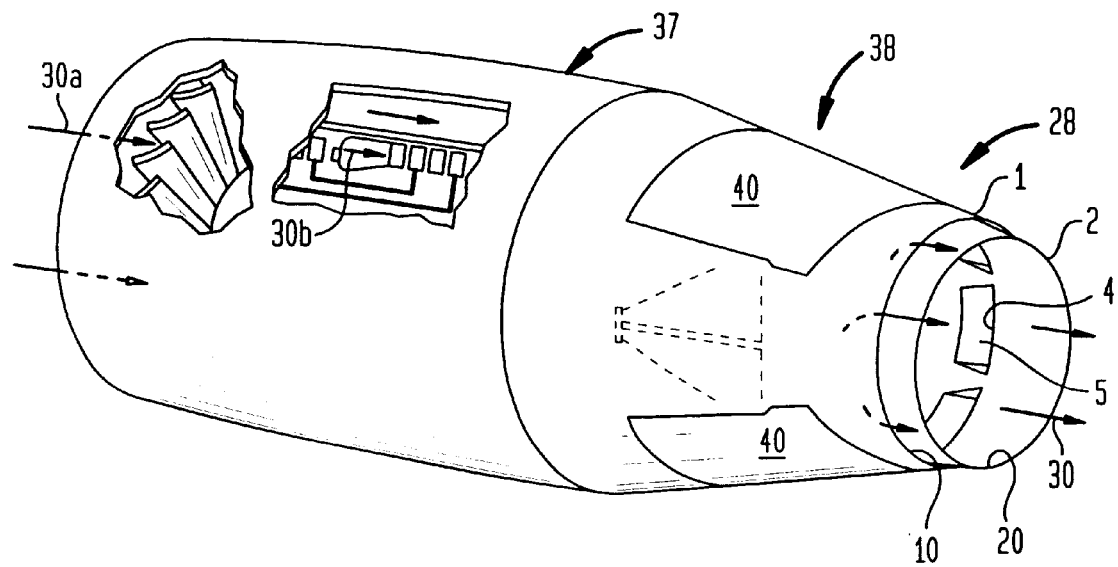
FIG. 23 is a partly cutaway, isometric view of a turbofan aircraft engine with a thrust reverser and variable exhaust nozzle in accordance with another embodiment of the invention.

Illustrated in FIG. 23 is a gas turbine engine 37 in the exemplary form of a turbofan engine configured for powering an aircraft in flight. In this exemplary embodiment the engine is configured for being side-mounted to the fuselage of an aircraft near the tail thereof.

The engine may have any conventional configuration and typically includes a single stage fan having rotor blades through which ambient air 30a enters the engine during operation. The fan is powered by a core engine having a compressor that pressurizes a portion of the fan air which is then mixed with fuel and ignited in a combustor for generating hot combustion gases 30b which are discharged through corresponding high and low pressure turbines disposed downstream therefrom. The high pressure turbine powers the compressor through a shaft therebetween, and the low pressure turbine powers the fan through another shaft therebetween.

The fan air bypasses the core engine inside a corresponding bypass duct defined between the outer nacelle of the engine and the outer casing of the core engine and mixes with the combustion gases at the aft end of the engine prior to discharge as a common exhaust stream 30 through an annular thrust reverser 38 mounted to the aft end of the engine. But for the thrust reverser, the engine may have any conventional configuration and is operated in a conventional manner for powering an aircraft from takeoff, cruise, descent, and landing.

Accordingly, the thrust reverser 38 is provided for use only during landing of the aircraft for providing braking reverse thrust for assisting and stopping the aircraft along the runway. As indicated above, the variable exhaust nozzle, indicated by reference numeral 28 in this embodiment, may be integrated with any type of thrust reverser, including the reverser shown in FIG. 11.

Figure 24:
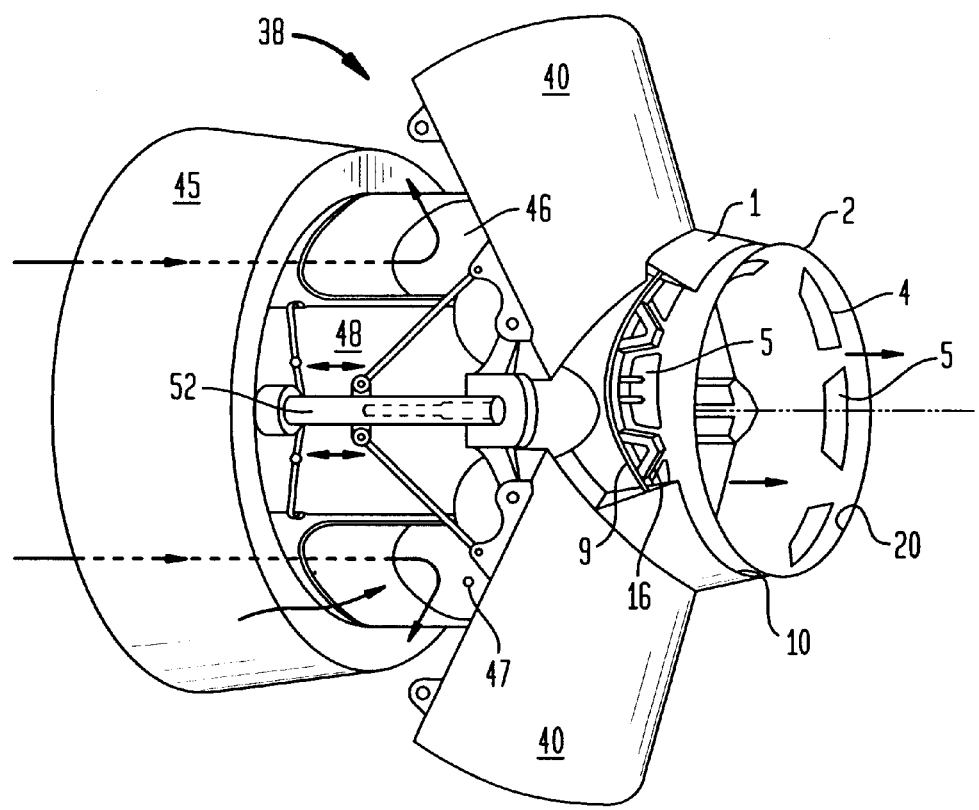
FIG. 24 is an isometric view of the thrust reverser and exhaust nozzle of FIG. 23 during reverser door deployment.

FIG. 24 illustrates in more detail this integration. The engine exhaust nozzle 28 in this embodiment includes the inner conduit 2 having a main outlet 20 at an aft end thereof. The inner conduit includes a row of radial apertures 4 spaced upstream from the outlet.

Figure 25:
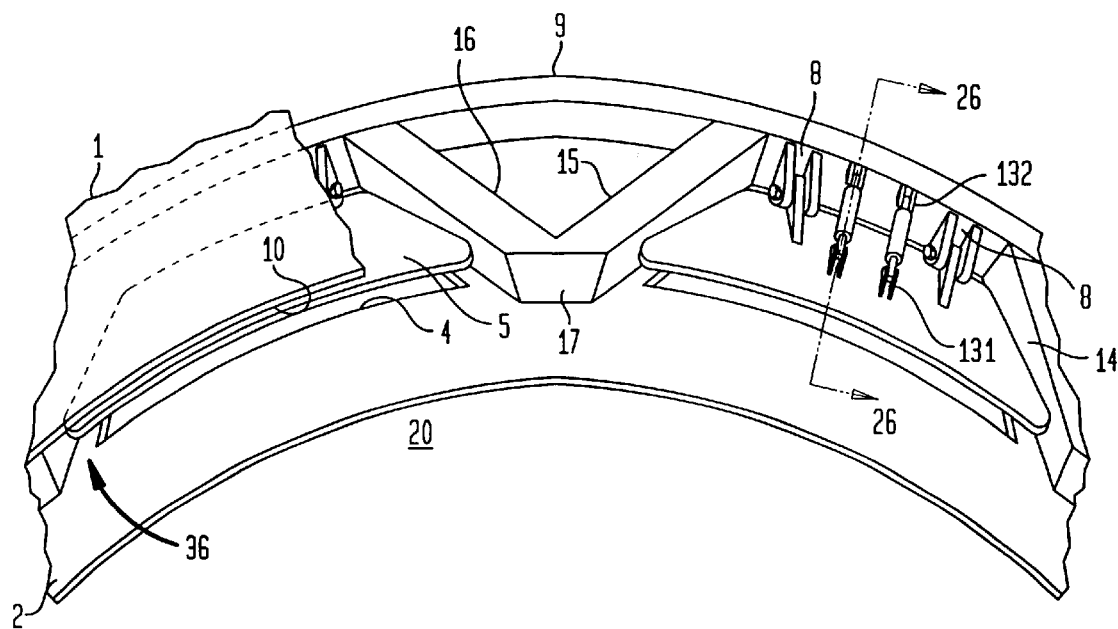
FIG. 25 is an aft-facing-forward view of a portion of the variable exhaust nozzle illustrated in FIG. 24.

The outer conduit 1 had an auxiliary outlet 10 at an aft end thereof, and surrounds the inner conduit 2 over the apertures 4 to form the bypass channel 36, shown in more detail in FIG. 25, terminating at the auxiliary outlet 10. The plurality of flaps 5 are hinged at upstream ends thereof to selectively cover and uncover corresponding ones of the apertures and selectively bypass a portion of the combined exhaust flow 30 from the inner conduit through the outer conduit in confluent streams from both the main and auxiliary outlets.

This configuration of concentric conduits 1,2 with radial apertures selectively closed by the flaps 5 is relatively simple, requires few parts and little additional weight, and is aerodynamically efficient in operation.

Since the radial apertures are arranged in a circumferential row in the inner conduit 2, the nozzle preferably also includes the radial frame 9 extending circumferentially between the outer and inner conduits and disposed forward of the apertures. The radial frame stiffens the assembly of the inner and outer conduits joined thereto, and stiffens the inner conduit at the row of apertures.

A plurality of longitudinal frames, such as frames 14–16, preferably extend axially from the radial frame, and are disposed circumferentially between corresponding ones of the apertures. The longitudinal frames may have any suitable configuration to additionally stiffen the inner conduit at the apertures 4, and block circumferential crossflow of the exhaust gases when being discharged therethrough. In this way, axial momentum of the exhaust gases is maintained between the two conduits for maximizing propulsion efficiency.

The exhaust nozzle further includes means for closing the flaps 5 atop the apertures 4 for blocking flow therethrough when desired, during cruise for example. These means may also be configured for permitting the flaps to automatically open and uncover the apertures under differential pressure between the inner and outer conduits.

In the embodiment previously shown in FIGS. 3, 4, and 7, these means include the plurality of inflatable bladders 13 joined to corresponding ones of the flaps between the outer and inner conduits. The bladders are sized to radially bridge the bypass channel 36 when inflated for maintaining closed the flaps atop the apertures.

The means 32,34 illustrated in FIG. 7 may be used for selectively inflating the bladders 13 to close the flaps, and deflating the bladders, by suitable venting, to permit the flaps to open under differential pressure. The static pressure of the exhaust flow discharged through the inner conduit 2 increases with increasing engine thrust, and is substantially larger than the ambient pressure inside the outer conduit 1.

The positive differential pressure generated between the inner and outer conduits may be advantageously used to force open the flaps when applied thereto. During takeoff operation when additional exit area is desired, the exhaust pressure inherently increases and may be used to force open the flaps and thereby provide additional exit area through the auxiliary outlet 10 at the downstream end of the outer conduit.

Figure 26:
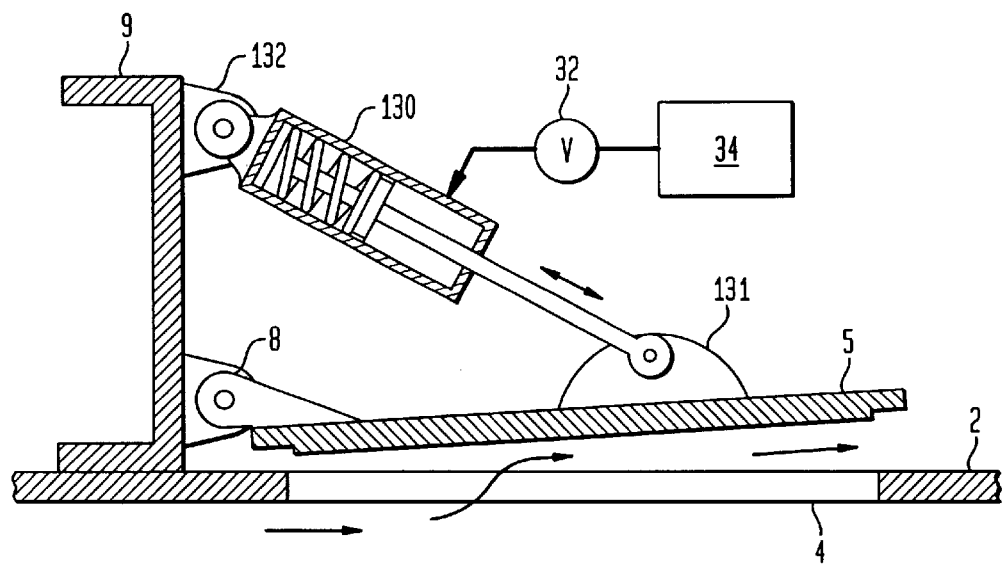
FIG. 26 is an axial sectional view through a flap portion of the exhaust nozzle illustrated in FIG. 25 and taken along line 26—26.

In the preferred embodiment illustrated in FIGS. 24–26, a plurality of spring actuators 130 are mounted between corresponding ones of the flaps 5 and the radial frame 5 using the devises 131, 132 described above. For example, two spring actuators may be used for each flap, with each actuator including a compression spring for biasing closed the flaps atop the apertures. The configuration of the actuator and the number thereof may be determined for each application depending on the amount of differential exhaust flow pressure, and surface area of the flaps.

The actuators should be configured to bias closed the flaps for all operation of the engine, except as desired for takeoff for example. And, the actuators should be configured to permit the flaps to open and uncover the apertures under a predetermined amount of differential pressure between the inner and outer conduits for discharge through the auxiliary outlet.

In the preferred embodiment illustrated in FIG. 26, the actuators 130 are passive devices without external power, and the flaps open and close solely under the action of the differential pressure developed during operation between the two conduits.

In an alternate embodiment, also shown schematically in FIG. 26, means 32,34 are provided for powering the actuators to open the flaps. In this embodiment both the actuators 130 and powering means 32,34 are configured together for powering open the flaps when desired, and permitting passive closing thereof.

This may be accomplished by using the altitude pressure valve 32 to selectively provide external fluid power from the pressure source 34 to retract the output rod of the actuator and withdraw the flap from the aperture. The actuator 130 may therefore be configured as a one-way pneumatic or hydraulic servomotor to retract its output rod to open the flap, with the spring extending the rod to close the flap when the external pressure is vented from the actuator.

In yet another embodiment, the actuators may be configured as conventional two-way servomotors without the internal spring, for selectively powering open and powering closed the flaps as desired for controlling operation of the variable area exhaust nozzle.

In the exemplary embodiment illustrated in FIGS. 23 and 24, the main and auxiliary outlets 20, 10 are axially spaced apart from each other in parallel planes, and disposed aft of the thrust reverser doors 40. In this way, fishmouth drag is avoided, and the combined thrust reverser and variable area nozzle enjoy improved efficiency.

Although the auxiliary outlet 10 is spaced upstream from the main outlet 20 and exposes surface area around the inner conduit, base drag therefrom is relatively small. However, in this configuration significant noise attenuation may be obtained. Firstly, opening of the flaps increases the total outlet area for correspondingly reducing the velocity of the exhaust flow through both outlets 10,20. Secondly, the exhaust stream discharged from the auxiliary outlet 10 is effective for energizing and accelerating the ambient air over the exposed surface area around the inner duct, thusly additionally reducing the difference in velocity between the ambient air and the exhaust flow.

If desired, the exhaust nozzle illustrated in FIGS. 23 and 24 may be modified in the same manner illustrated in FIGS. 3A, 4A so that the main and auxiliary outlets are axially coplanar. This may be effected by introducing the flexible skirt 110 at the aft end of the outer conduit 1 for defining a variable area auxiliary outlet.

The skirt 110 may be elastic for contracting closed the auxiliary outlet 10 around the main outlet 20 when the flaps are closed, and expanding open the auxiliary outlet under pressure from the exhaust flow through the apertures 4 when the flaps are open.

As shown in FIGS. 24, 25, and FIG. 4, for example, the outer and inner conduits 1,2 preferably converge aft toward the outlets thereof to provide concentric and confluent exhaust flow discharge when the flaps are open. Correspondingly, the bypass channel 36 preferably also converges aft to the auxiliary outlet 10. In this way, the exhaust gases being discharged through both conduits 1,2 converge for maintaining efficient discharge. And, the exhaust flow discharged through the bypass channel of the outer conduit maintains boundary layer attachment without undesirable flow separation.

As indicated above, the confluent variable area exhaust nozzle may be used with or without thrust reversers for either core gas discharge or fan air discharge depending on the type of turbofan engine. In the embodiment illustrated in FIGS. 23 and 24, the exhaust nozzle is preferentially integrated with the thrust reverser disposed upstream from the radial frame.

The thrust reverser 38 includes the doors 40 covering the corresponding side openings 46,47. Means, such as the side actuators 52, are provided for selectively opening the doors to uncover the side openings for reversing thrust from the exhaust flow.

The thrust reverser also includes the forward barrel 45 and the aft barrel defining the inner conduit 2 integrally joined together by the lateral beams 48 defining the side openings 46,47 therebetween. The outer conduit 1 preferably forms a smooth outer mold line with the forward barrel and doors when the doors are stowed closed.

Thrust reversing operation is effected by a pair of thrust reverser doors 40 disposed in respective ones of the openings or portals 46,47, with each door having a generally arcuate shape in the typical form of clamshell thrust reverser doors. The individual doors may be formed in any conventional manner including inner and outer skins with reinforcing ribs therebetween. And, the inner and outer conduits may also be configured in any suitable form with a smooth inner and outer skins.

As shown in FIG. 24, each of the two doors 40 is rotatably mounted at opposite circumferential sides thereof to the two side beams 48 by corresponding pivots. Each door thusly includes two pivots disposed on the sides thereof upstream from the trailing edge of the door, which define a single pivot axis for swinging open or closed the individual doors in their respective portals.

A pair of side actuators 52 are fixedly mounted on respective ones of the two side beams and are operatively joined to the doors by corresponding links for selective rotation of the doors about the pivots to deploy the doors during thrust reverser operation and to stow the doors for all other normal operation of the engine when thrust reverse is not required.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine exhaust nozzle comprising:
   an inner conduit having a main outlet at an aft end thereof, and including a row of radial apertures spaced upstream from said outlet;
   an outer conduit having an auxiliary outlet at an aft end thereof, and surrounding said inner conduit over said apertures to form an axially unobstructed bypass channel terminating at said auxiliary outlet; and
   a plurality of flaps hinged at upstream ends thereof to selectively cover and uncover corresponding ones of said apertures and selectively bypass a portion of exhaust flow from said inner conduit through said outer conduit in confluent streams from both said main and auxiliary outlets.

2. A gas turbine engine exhaust nozzle comprising:
   an inner conduit having a main outlet at an aft end thereof, and including a row of radial apertures spaced upstream from said outlet;
   an outer conduit having an auxiliary outlet at an aft end thereof, and surrounding said inner conduit over said apertures to form a bypass channel terminating at said auxiliary outlet;
   a plurality of flaps hinged at upstream ends thereof to selectively cover and uncover corresponding ones of said apertures and selectively bypass a portion of exhaust flew from said inner conduit through said outer conduit in confluent streams from both said main and auxiliary outlets;
   a radial frame extending circumferentially between said outer and inner conduits forward of said apertures; and
   a plurality of longitudinal frames extending axially from said radial frame and disposed circumferentially between corresponding ones of said apertures.

3. An exhaust nozzle according to claim 2 further comprising means for closing said flaps to block flow through said apertures.

4. An exhaust nozzle according to claim 2 further comprising means for permitting said flaps to open and uncover said apertures under differential pressure between said inner and outer conduits.

5. An exhaust nozzle according to claim 2 further comprising a plurality of inflatable bladders joined to corresponding ones of said flaps between said outer and inner conduits, and sized to radially bridge said bypass channel when inflated for maintaining closed said flaps to block flow through said apertures.

6. An exhaust nozzle according to claim 5 further comprising means for selectively inflating said bladders to close said flaps, and deflating said bladders to permit said flaps to open.

7. An exhaust nozzle according to claim 2 further comprising a plurality of spring actuators mounted between corresponding ones of said flaps and said radial frame for biasing closed said flaps to block flow through said apertures.

8. An exhaust nozzle according to claim 7 wherein said actuators are sized for permitting said flaps to open and uncover said apertures under differential pressure between said inner and outer conduits.

9. An exhaust nozzle according to claim 8 wherein said actuators are passive devices without external power.

10. An exhaust nozzle according to claim 7 further comprising means for powering said actuators to open said flaps.

11. An exhaust nozzle according to claim 10 wherein said actuators and powering means are configured for powering open said flaps and permitting passive closing thereof.

12. An exhaust nozzle according to claim 2 wherein said main and auxiliary outlets are axially spaced apart in parallel planes.

13. An exhaust nozzle according to claim 12 wherein said auxiliary outlet is spaced upstream from said main outlet.

14. An exhaust nozzle according to claim 2 wherein said main and auxiliary outlets are axially coplanar.

15. An exhaust nozzle according to claim 14 wherein said outer conduit includes a flexible skirt at said aft end thereof for defining a variable area auxiliary outlet.

16. An exhaust nozzle according to claim 15 wherein said skirt is elastic for contracting closed said auxiliary outlet around said main outlet when said flaps are closed, and expanding open said auxiliary outlet under pressure from said exhaust flow through said apertures when said flaps are open.

17. An exhaust nozzle according to claim 2 wherein said outer and inner conduits converge aft toward said outlets thereof to provide concentric and confluent exhaust flow discharge when said flaps are open.

18. An exhaust nozzle according to claim 17 wherein said bypass channel converges aft to said auxiliary outlet.

19. An exhaust nozzle according to claim 2 further comprising a thrust reverser disposed upstream of said radial frame.

20. An exhaust nozzle according to claim 19 wherein said thrust reverser includes:
   a plurality of doors covering corresponding side openings; and
   means for selectively opening said doors to uncover said side openings for reversing thrust from said exhaust flow.

21. An exhaust nozzle according to claim 19 wherein said thrust reverser further comprises:
   a forward barrel and an aft barrel defining said inner conduit integrally joined together by lateral beams defining said side openings therebetween; and
   said outer conduit forms a smooth outer mold line with said forward barrel and doors when stowed closed.

22. A gas turbine engine exhaust nozzle comprising:
   a forward barrel and an aft barrel defining an inner conduit integrally joined together by lateral beams defining side openings therebetween;
   a plurality of doors covering corresponding ones of said side openings;
   means for selectively opening said doors to uncover said side openings for reversing thrust from said exhaust flow;
   said inner conduit having a main outlet at an aft end thereof, and including a row of radial apertures spaced upstream front said outlet;

an outer conduit having an auxiliary outlet at an aft end thereof, and surrounding said inner conduit over said apertures to form a bypass channel terminating at said auxiliary outlet; and a plurality of flaps hinged at upstream ends thereof to selectively cover and uncover corresponding ones of said apertures and selectively bypass a portion of exhaust flow from said inner conduit through said outer conduit in confluent streams from both said main and auxiliary outlets.

23. An exhaust nozzle according to claim 22 further comprising means for permitting said flaps to open and uncover said apertures under differential pressure between said inner and outer conduits.

24. An exhaust nozzle according to claim 23 further comprising:

a radial frame extending circumferentially between said outer and inner conduits forward of said apertures and aft of said side openings; and a plurality of longitudinal frames extending axially from said radial frame and disposed circumferentially between corresponding ones of said apertures.

25. An exhaust nozzle according to claim 24 further comprising a plurality of spring actuators mounted between corresponding ones of said flaps and said radial frame for biasing closed said flaps atop said apertures.

26. An exhaust nozzle according to claim 25 wherein said auxiliary outlet is spaced upstream from said main outlet and parallel thereto.

27. An exhaust nozzle according to claim 25 wherein said main and auxiliary outlets are axially coplanar.

28. An exhaust nozzle according to claim 25 wherein said outer and inner conduits converge aft toward said outlets thereof to provide concentric and confluent exhaust flow discharge when said flaps are open.

29. An exhaust nozzle according to claim 28 wherein said bypass channel converges aft to said auxiliary outlet.

* * * * *